US006568373B2

(12) United States Patent
Yuya et al.

(10) Patent No.: US 6,568,373 B2
(45) Date of Patent: May 27, 2003

(54) FUEL INJECTION CONTROL FOR START-UP OF INTERNAL COMBUSTION ENGINE

(75) Inventors: Masahiko Yuya, Yokohama (JP); Ritsuo Sato, Yokohama (JP); Hiroshi Katoh, Yokohama (JP); Takahisa Koseki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/216,384

(22) Filed: Aug. 12, 2002

(65) Prior Publication Data

US 2003/0037771 A1 Feb. 27, 2003

(30) Foreign Application Priority Data

Aug. 15, 2001 (JP) ........................................ 2001-246489

(51) Int. Cl.[7] .............................................. F02M 51/00
(52) U.S. Cl. ........................ 123/491; 123/478; 123/480
(58) Field of Search ................................ 123/491, 478, 123/480, 434, 445

(56) References Cited

U.S. PATENT DOCUMENTS

| 5,404,862 | A |   | 4/1995 | Ohta et al. |   |
|---|---|---|---|---|---|
| 5,615,660 | A |   | 4/1997 | Iwano et al. |   |
| 6,192,868 | B1 | * | 2/2001 | Barnes et al. | 123/491 |

FOREIGN PATENT DOCUMENTS

JP 2000-45841 2/2000

OTHER PUBLICATIONS

U.S. patent application Ser. No. 10/218,112, Yuya et al., filed Aug. 14, 2002.
U.S. patent application Ser. No. 10/217,515, Sato et al., filed Aug. 14, 2002.
U.S. patent application Ser. No. 10/216,173, Katoh et al., filed Aug. 12, 2002.
U.S. patent application Ser. No. 10/216,385, Sato et al., filed Aug. 12, 2002.

* cited by examiner

Primary Examiner—Bibhu Mohanty
(74) Attorney, Agent, or Firm—Foley & Lardner

(57) ABSTRACT

An internal combustion engine (2) provided with a starter motor sequentially performs combustion of fuel in a plurality of cylinders (#1–#4). Each cylinder is provided with an intake port (7) and a fuel injector (8) to inject fuel in the intake port (7) and repeatedly performs an intake stroke, compression stroke, expansion stroke and an exhaust stroke. A sensor (9, 11) generates a signal identifying a cylinder in a specific position in a specific stroke and the controller (1) executes a cylinder-stroke identification in response to the signal. Upon the first execution of the cylinder-stroke identification when the engine is cranked, a fuel injection is performed for a cylinder in the intake stroke and for a cylinder in the exhaust stroke simultaneously so as to ensure the fuel supply amount required for the first combustion in each cylinder.

20 Claims, 31 Drawing Sheets

4 AIR FLOW METER
8 FUEL INJECTOR
9 CRANK ANGLE SENSOR
11 CAM POSITION SENSOR
13 IGNITION SWITCH
14 IGNITION COIL
15 WATER TEMPERATURE SENSOR
16 AIR-FUEL RATIO SENSOR
21 BATTERY VOLTAGE SENSOR

FUEL INJECTION CONTROL FOR START-UP OF INTERNAL COMBUSTION ENGINE

FIELD OF THE INVENTION

This invention relates to fuel injection control for starting up an internal combustion engine.

BACKGROUND OF THE INVENTION

Tokkai 2000-45841 published by the Japanese Patent Office in 2000 discloses simultaneous fuel injection to all cylinders of an engine immediately after the ignition switch is switched to the ON position.

In a spark-ignition engine injecting fuel sequentially into the intake port, fuel injected during cranking of the engine adheres to the wall surface of the intake port and tends to form a flow along the wall. This phenomenon is hereafter referred to as "wall flow". Consequently time is required for fuel to reach the combustion chamber and preferred stability of combustion during cranking of the engine can not be obtained. The prior-art technique aims to form a wall flow in advance as a result of injecting fuel all at once to all cylinders immediately after the ignition switch is turned to the ON position. As a result, fuel injected sequentially to respective cylinders thereafter flows into the combustion chamber smoothly without adhering to the wall face of the intake port.

SUMMARY OF THE INVENTION

Spark ignition of the air-fuel mixture in each cylinder is generally performed in the vicinity of the compression dead center. However, it is noted that each cylinder performs respectively different strokes when simultaneous injection to all cylinders is performed. Furthermore in the period after simultaneous injection to all cylinders until initial spark ignition to each cylinder, some cylinders undergo sequential fuel injection while others do not undergo sequential fuel injection.

As a result, a deviation is produced in the air-fuel ratio of the fuel mixture at initial sparking ignition in each cylinder. In cylinders having a lean air-fuel ratio, misfiring may result. In cylinders having a rich air-fuel ratio, incomplete combustion may result. Both misfiring or incomplete combustion have an adverse effect on the stability of the engine and on the exhaust emission components.

It is therefore an object of this invention to increase stability of combustion in each cylinder when starting an engine which performs sequential fuel injection.

In order to achieve the above object, this invention provides a fuel injection control device for use with such an internal combustion engine that comprises a plurality of cylinders which sequentially perform a combustion of fuel and a starter motor which cranks up the engine. Each of the cylinders is provided with an intake port and a fuel injector which injects fuel into the intake port, and sequentially preforms an intake stroke, a compression stroke, a expansion stroke and an exhaust stroke.

The fuel injection control device comprises a first sensor which detects a start of the starter motor, a second sensor which detects a cylinder in a specific position in a specific stroke and generates a corresponding signal, and a programmable controller.

The controller is programmed to execute a cylinder-stroke identification identifying a present stroke of each cylinder based on the signal generated by the second sensor, and control the fuel injectors to simultaneously perform a primary fuel injection for a cylinder in the intake stroke and for a cylinder in the exhaust stroke simultaneously, on the first execution of the cylinder-stroke identification.

This invention also provides a fuel injection control method for the above internal combustion engine. The method comprises detecting a start of the starter motor, detecting a cylinder in a specific position in a specific stroke, executing a cylinder-stroke identification identifying a present stroke of each cylinder based on the cylinder in the specific position in the specific stroke, and controlling the fuel injectors to simultaneously perform a primary fuel injection for a cylinder in the intake stroke and for a cylinder in the exhaust stroke simultaneously, on the first execution of the cylinder-stroke identification.

The details as well as other features and advantages of this invention are set forth in the remainder of the specification and are shown in the accompanying drawings.

DESCRIPTION OF THE PREFERRED EMBODIMENTS

Figure 1:
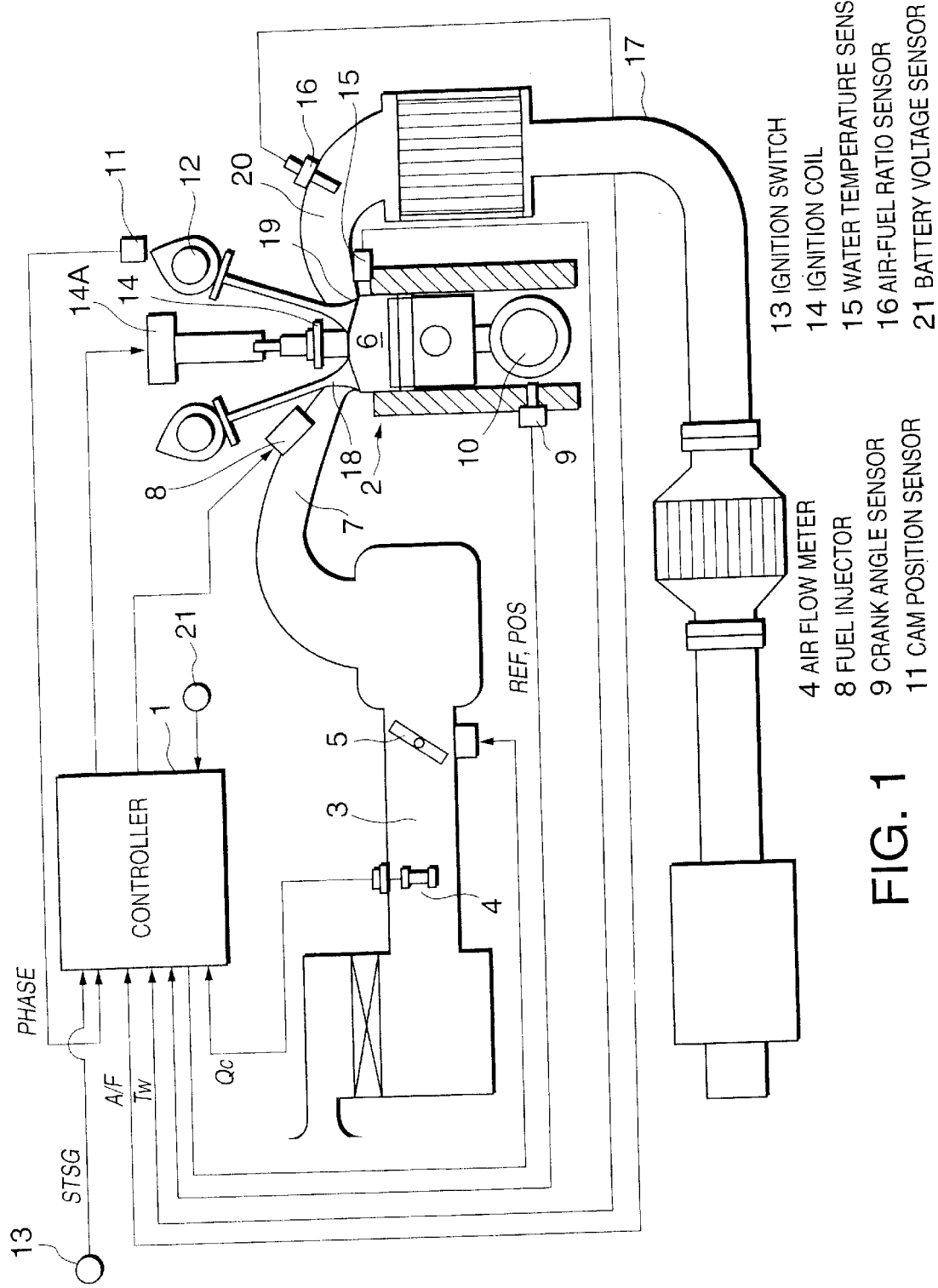
FIG. 1 is a schematic diagram of an internal combustion engine to which this invention is applied.

Referring to FIG. 1 of the drawings, a four-cylinder gasoline engine 2 for a vehicle is provided with an intake pipe 3 and an exhaust gas pipe 17.

The intake pipe 3 is connected to an intake port 7 for each cylinder via a collector and an intake manifold branching off therefrom. A fuel injector 8 and an intake valve 18 are provided in the intake port 7 of each cylinder. A combustion chamber 6 combusting a mixture of fuel injected by the fuel injector 8 and air aspirated through the intake port 3 are formed in each cylinder. The fuel injector 8 injects fuel in response to an input injection pulse signal.

The amount of air aspirated from the intake pipe 3 is regulated by a throttle 5 provided in the midway along the intake pipe 3. A combustion gas of the air-fuel mixture is discharged from the combustion chamber 6 as an exhaust gas to the exhaust gas pipe 17 through an exhaust valve 19 and an exhaust port 20.

The engine 2 is a four-stroke cycle engine in which each cylinder #1 through #4 repeats the cycle of an intake, a compression, an expansion and an exhaust stroke for two rotations of a crank shaft 10. The cycle is repeated in the sequence of #1, #3, #4, #2. During a steady-state operation, fuel is injected from a fuel injector 8 in the exhaust stroke of each cylinder as a result of the input of the injection pulse signal to the fuel injector 8 from a controller 1.

A spark plug 14 is provided facing the combustion chamber 6 in each cylinder in order to ignite the air-fuel mixture in the combustion chamber 6. The spark plug 14 generates a spark in the vicinity of a compression dead center of each cylinder in response to a sparking signal input to an ignition coil 14A.

The air-fuel ratio of the air-fuel mixture is controlled to a predetermined target air-fuel ratio by the controller 1. In order to realize this control, the controller 1 is provided with signals input respectively from an air flow meter 4 which detects an intake air amount Qc through the intake pipe 3, a water temperature sensor 15 which detects a temperature Tw of cooling water in the engine 2, an air-fuel ratio sensor 16 which detects the air-fuel ratio A/F of the air-fuel mixture based on an oxygen concentration in the exhaust gas, a crank angle sensor 9 which detects a specific rotation position of the crank shaft 10 of the engine 2, a cam position sensor 11 which detects a specific rotation position of a cam 12 which drives the exhaust valve 19 for each cylinder and an ignition switch 13.

The ignition switch 13 is operated by a driver of the vehicle. In a first operating step, a controller 1 and a fuel pump supplying fuel to the fuel injector 8 are started. In a second operating step, a starter motor which cranks up the engine 2 is started.

A signal IGN which shows that the first operating step has been performed and a signal STSG which shows that the second operating step has been performed are respectively input to the controller 1 from the ignition switch 13.

Next the relationship of the specific rotation position of the cam 12 detected by the cam position sensor 11 and the specific rotation position of the crank shaft 10 detected by the crank angle sensor 9 will be described.

The crank angle sensor 9 detects the specific rotation position of the crank shaft 10 which corresponds to a predetermined angle before the compression dead center of each cylinder and outputs a REF signal to the controller 1. In the four-cylinder engine 2, the REF signal is generated at an interval of 180 degrees. The crank angle sensor 9 also outputs a POS signal to the controller 1 when the crank shaft 10 rotates through one degree for example.

The cam position sensor 11 detects the specific rotation position of the cam 12 which drives the exhaust valve 19 of each cylinder and outputs a signal PHASE to the controller 1. With respect to the four-cylinder engine 2, the cam 12 rotates once for two rotations of the engine 2. The PHASE signal is input to the controller 1 in the sequence #1, #3, #4, #2 for each 180 degree rotation of the engine 2. The PHASE signal is used to identify which cylinders are in which stroke when the REF signal is input. In the description hereafter, the combination of the PHASE signal and the REF signal is termed the cylinder-stroke identification signal.

The controller 1 comprises a microcomputer provided with a central processing unit (CPU), a read only memory (ROM), a random access memory (RAM) and an input/output interface (I/O interface). The controller may comprise a plurality of such microcomputers.

Figure 2:
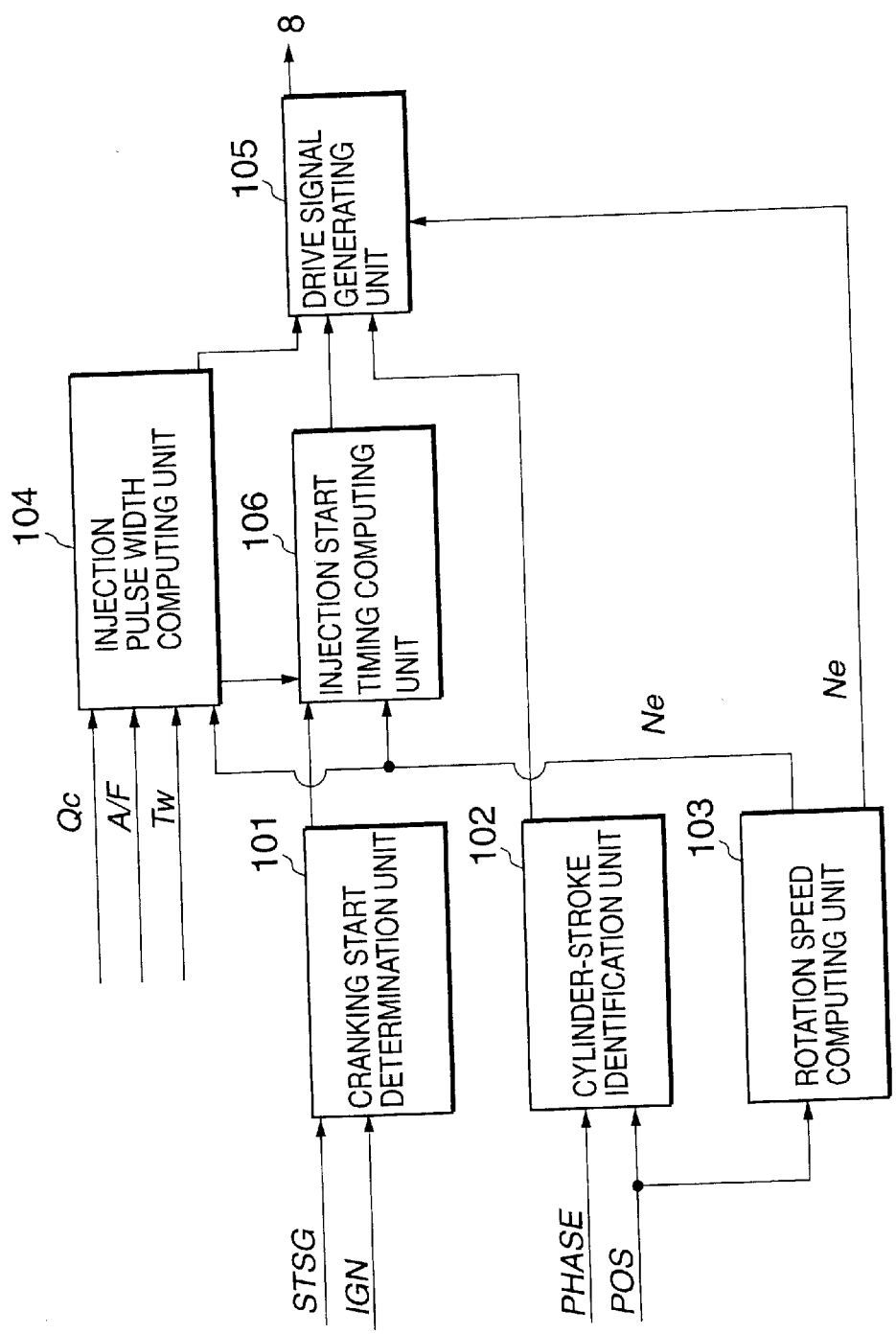
FIG. 2 is a block diagram describing a control function of a controller according to this invention.

Now referring to FIG. 2, the functions of the controller 1 related to fuel injection control will be described. The controller 1 is provided with a cranking start determination unit 101, a cylinder-stroke identification unit 102, a rotation speed computing unit 103, an injection pulse width computing unit 10, a drive signal generating unit 105, and an injection start timing computing unit 106. It should be noted that these units are merely virtual units for the purpose of describing the function of the controller 1 and do riot have physical existence.

The cranking start determination unit 101 detects the start of cranking of the engine 2 upon receiving the signal STSG from the ignition switch 13. The cylinder-stroke identification unit 102 determines the stroke and position of the respective cylinders based on the cylinder-stroke identification signal and the POS signal. The rotation speed computing unit 103 calculates the rotation speed Ne of the engine 2 based on the input number of POS signals per unit time. The injection pulse width computing unit 104 calculates the basic fuel injection pulse width TP by looking up a prestored map based on the intake air amount Qc detected by the air flow meter 4 and the engine rotation speed Ne. Various types of corrections are added based on the air-fuel ratio A/F of the air-fuel mixture detected by the air-fuel ratio sensor 16 and the cooling water temperature Tw detected by the water temperature sensor 15. In this manner, an injection amount command value that is to be output to the fuel injector 8 is determined. The injection start timing computing unit 106 determines the start timing of fuel injection according to fuel injection conditions. The drive signal generating unit 105 outputs an injection pulse signal to the fuel injector 8 based on the injection amount command value and the injection start timing.

Next the fuel injection control performed by the controller 1 when cranking the engine 2 will be described.

The controller 1 executes fuel injection control corresponding to three different periods for the fuel injection control when starting the engine 2 so that when the engine 2 is started, each cylinder performs stable combustion of the air-fuel mixture when the first ignition operation by the spark plug 14 is performed in each cylinder. The three periods are a preliminary period immediately after input of the first REF signal until input of a first cylinder-stroke identification signal, a starting period after the input of the first cylinder-stroke identification signal until the controller 1 completes receiving a cylinder-stroke identification signals for all the cylinders, and a normal operation period that follows the starting period.

The controller 1 performs fuel injection control with respect to these three periods according to three temperature ranges. The three temperature ranges are a normal temperature range not lower than 10° C., a low temperature range between −15° C. to 10° C. and an extremely low temperature range lower than −15° C. A temperature of 10° C. corresponds to a first predetermined temperature and −15° C. corresponds to a second predetermined temperature.

With respect to the preliminary period, the controller 1 performs a preliminary fuel injection, i.e., a simultaneous fuel injection for all the cylinders, when the engine 2 is in the low temperature range or the extremely low temperature range. In this manner, the movement of fuel injected by the fuel injector 8 to the combustion chamber 6 is facilitated by forming wall flow in advance as described in the conventional example. The preliminary fuel injection is not performed in the normal temperature range.

During the starting period, when operating in the normal temperature range or the low temperature range, the controller 1 first injects fuel into the cylinders in the exhaust stroke and the intake stroke when the first cylinder-stroke identification signal is input. This injection is termed a primary injection. Subsequently, fuel injection is performed sequentially on the cylinders in the exhaust stroke until the starting period terminates. This injection is termed a secondary injection.

In contrast, in the extremely low temperature range, the primary injection is performed only for the cylinder in the intake stroke. Subsequently, the secondary injection is performed sequentially for the cylinders in the intake stroke until the starting period terminates.

During the normal operation period, the controller 1 controls the fuel injector 8 to perform the sequential fuel injection for the cylinder in the exhaust stroke in the normal temperature range and in the low temperature range.

During the normal operating period in the extremely low temperature range, the controller 1 controls the fuel injector 8 to perform the sequential fuel injection for the cylinder in the intake stroke until the rotation speed Ne of the engine 2 becomes larger than a predetermined rotation speed, and after the rotation speed Ne becomes larger than the predetermined rotation speed, the controller 1 controls the fuel injector 8 to perform the sequential fuel injection for the cylinder in the exhaust stroke as in the case of the sequential fuel injection in the normal temperature range and in the low temperature range. The predetermined rotation speed is herein set equal to a thousand revolutions per minute (1000 rpm).

The above control will be described more in detail referring to flowcharts of FIGS. 3–14.

Figure 3:
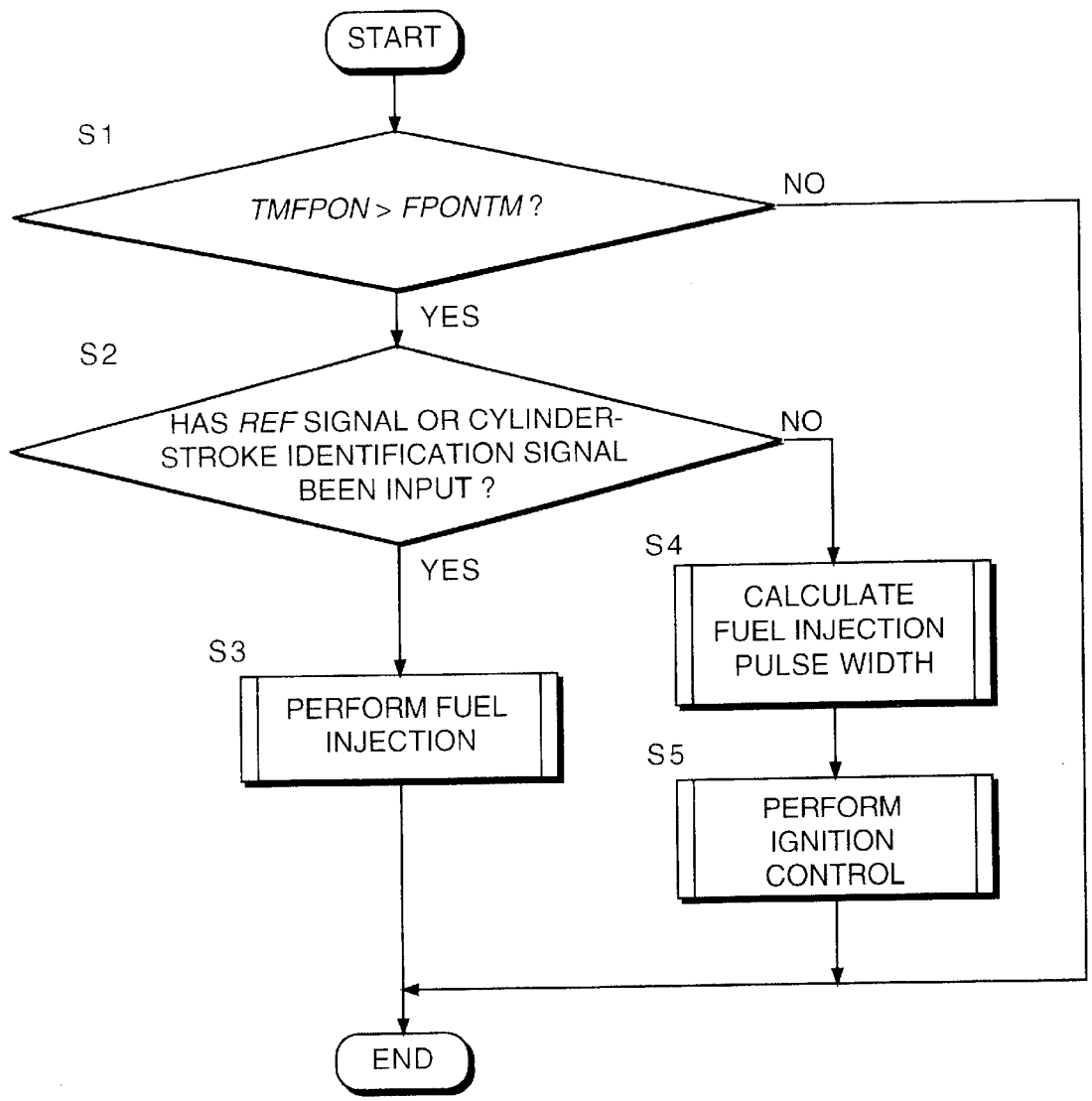
FIG. 3 is a flowchart describing a main routine executed by the controller for performing fuel injection and calculating fuel injection amount at engine start-up.

FIG. 3 shows a main routine for fuel injection control. The controller 1 performs this routine at an interval of ten milliseconds as long as the ignition switch 13 is in the ON position.

First, in a step S1, the controller 1 compares the elapsed time TMFPON after the first input of the signal IGN with a reference period FPONTM. As long as the elapsed time TMFPON is not greater than the reference period FPONTM, the controller 1 terminates the routine immediately without performing further steps.

The reference period FPONTM represents a period required from the operation start of the fuel pump until the fuel pressure reaches a steady-state pressure. In other words, fuel injection in any form is not performed by the controller 1 as long as the fuel pressure from the fuel pump has not reached the steady-state pressure. Such a processing is necessary in order to prevent deviations in the fuel injection amount resulting from an insufficient fuel pressure when starting the cranking of the engine 2.

When the elapsed time TMFPON is larger than the reference period FPONTM, in a step S2, the controller 1 determines whether or not the cylinder-stroke identification signal or REF signal has been input since the immediately preceding occasion when the routine was performed.

The step S2 merely has the function of determining whether or not fuel injection will be performed during the execution of the routine on this occasion. Since the rotation speed of the engine 2 is low during the cranking, the routine is performed several times while the engine 2 undergoes a single rotation during the cranking. Consequently it is necessary to perform this determination on each occasion the routine is performed since the execution interval of fuel injection is larger than the execution interval of the routine.

When the condition of the step S2 is satisfied, it means that fuel injection has to be performed during the execution of the routine on this occasion.

Figure 4:
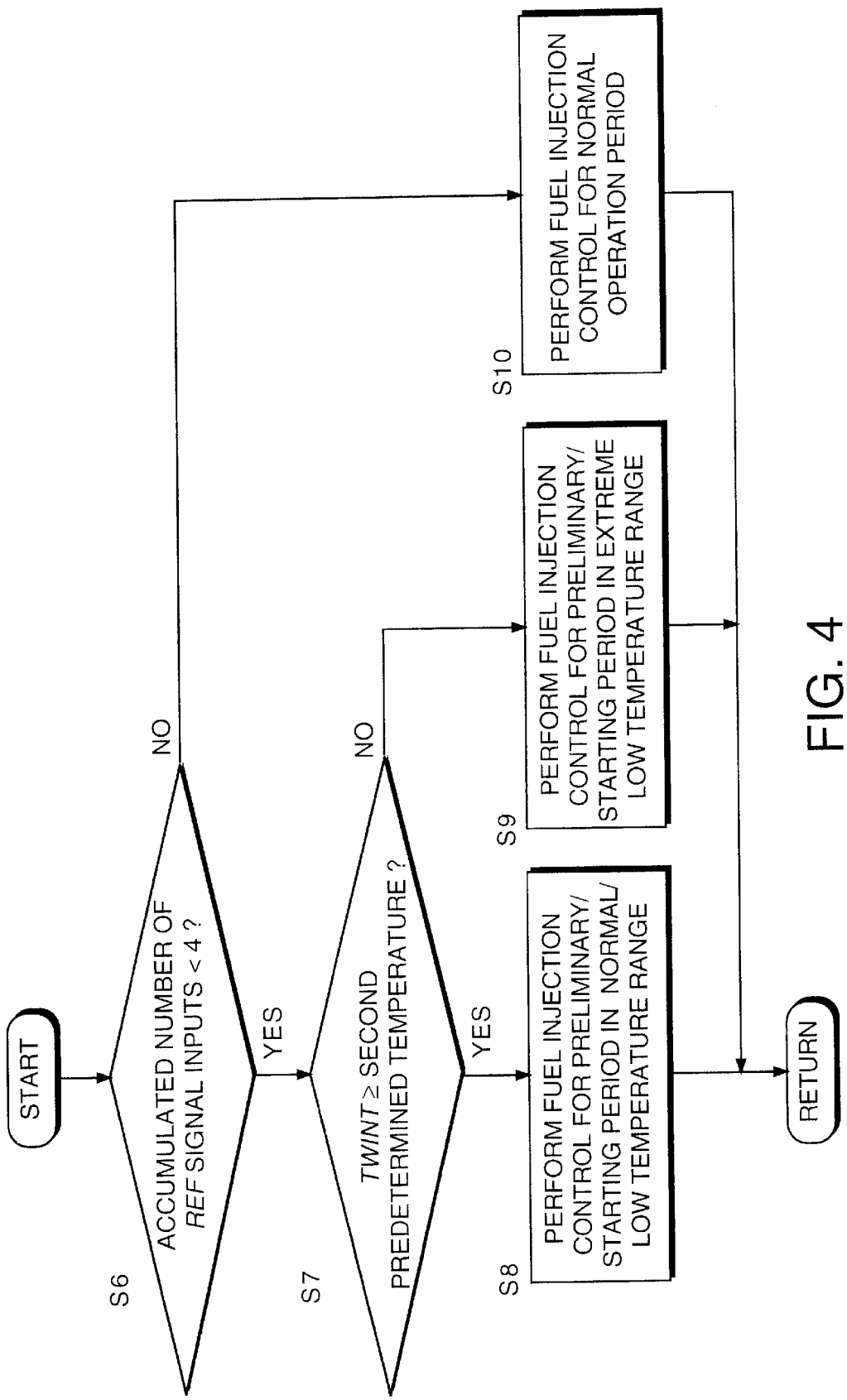
FIG. 4 is a flowchart describing a subroutine for performing fuel injection executed by the controller.

In this case, the controller 1 executes a subroutine shown in FIG. 4 in a following step S3 in order to perform fuel injection. The determination in the step S2 is performed irrespective of the temperature range. In other words, the process in the step S3 is common to all three temperature ranges.

When the condition of the step S2 is not satisfied, it means that the fuel injection has not to be performed during the execution of the routine on this occasion.

Figure 10:
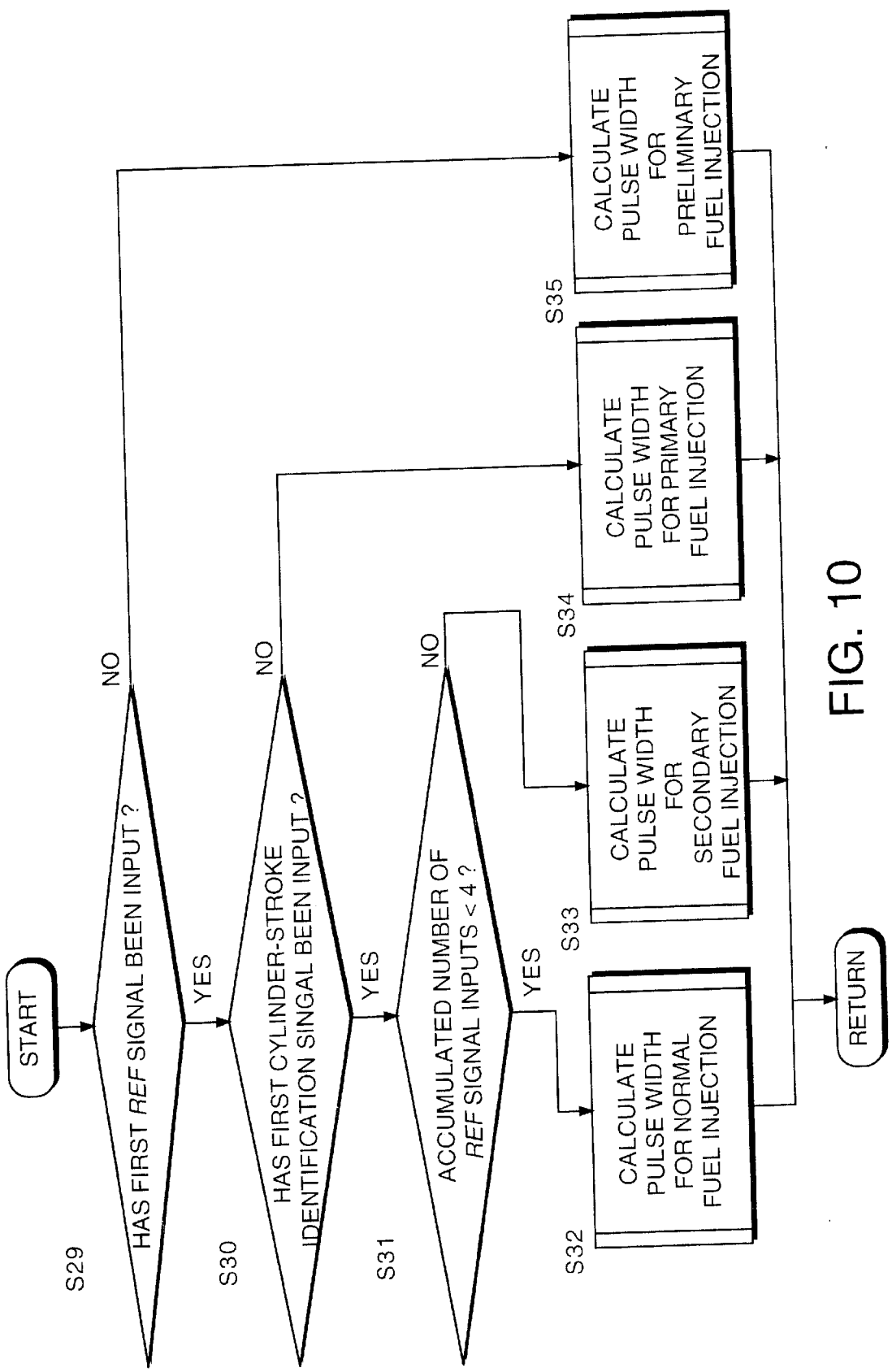
FIG. 10 is a flowchart describing a subroutine executed by the controller for calculating a fuel injection pulse width.

In this case, the controller 1 calculates the fuel injection pulse width by performing a subroutine shown in FIG. 10 in a step S4. Furthermore ignition control in the step S5 is performed. Since the ignition control is not included in the subject matter of this invention, the description thereof will be omitted.

After the process of the step S3 or the step S5, the controller 1 terminates the routine.

It should be noted that in the step S3, only the selection of the cylinder for fuel injection and the determination of the start period of injection are performed. The fuel injection pulse width applied in process of the step S3 is the value that was calculated on the immediately preceding occasion when the process of the step S4 was performed.

Referring now to FIG. 4, a subroutine for fuel injection control performed by the controller 1 in the step S3 of FIG. 3 will be described.

First, in a step S6, the controller 1 determines whether or not an accumulated number of REF signal inputs is smaller than a predetermined value of four. This step determines whether or not the starting period has finished, or in other words, determines whether or not the REF signal has been input a number of times which is equal to the number of cylinders. The predetermined number therefore depends on the number of cylinders of the engine 2.

In the step S6, when the accumulated number of REF signal inputs is not smaller than four, it is determined that the starting period has terminated and the normal operation period has started. In this case, the controller 1 performs a fuel injection control for the normal operation period by performing a subroutine shown in FIG. 7 in a step S10.

In the step S6, when the accumulated number of REF signal inputs is smaller than four, the starting period is determined not to have completed.

In this case, in a step S7, the controller 1 compares a water temperature TWINT detected by the water temperature sensor 15 when the cranking was started, or when the signal STSG was first input, with the second predetermined temperature of –15° C.

Figure 6:
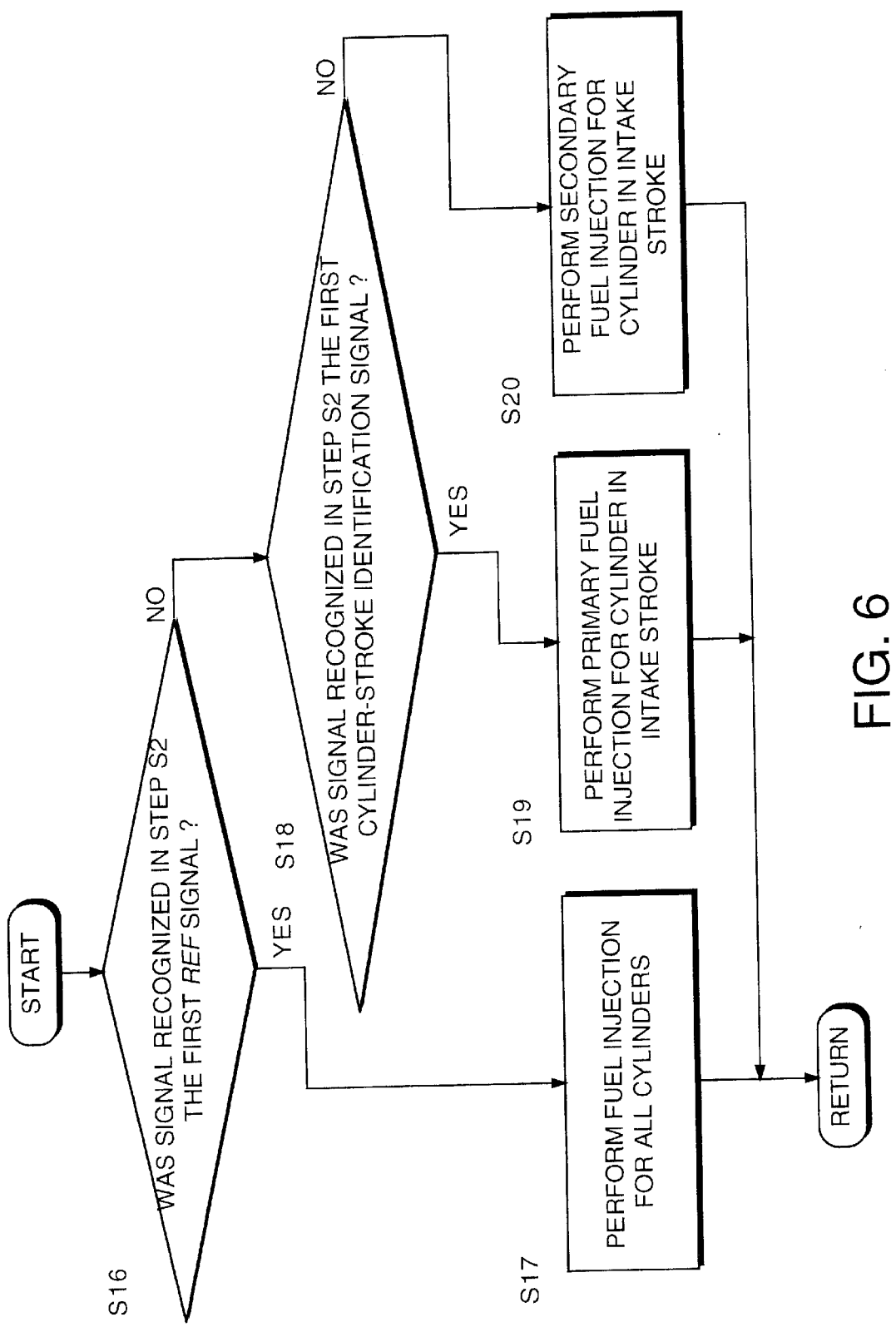
FIG. 6 is a flowchart describing a subroutine for performing fuel injection in an extremely low temperature range executed by the controller.

When the water temperature TWINT at startup of cranking is lower than –15° C., the controller 1 performs a fuel injection operation in the extremely low temperature range according to a subroutine shown in FIG. 6 in a step S9.

Figure 5:
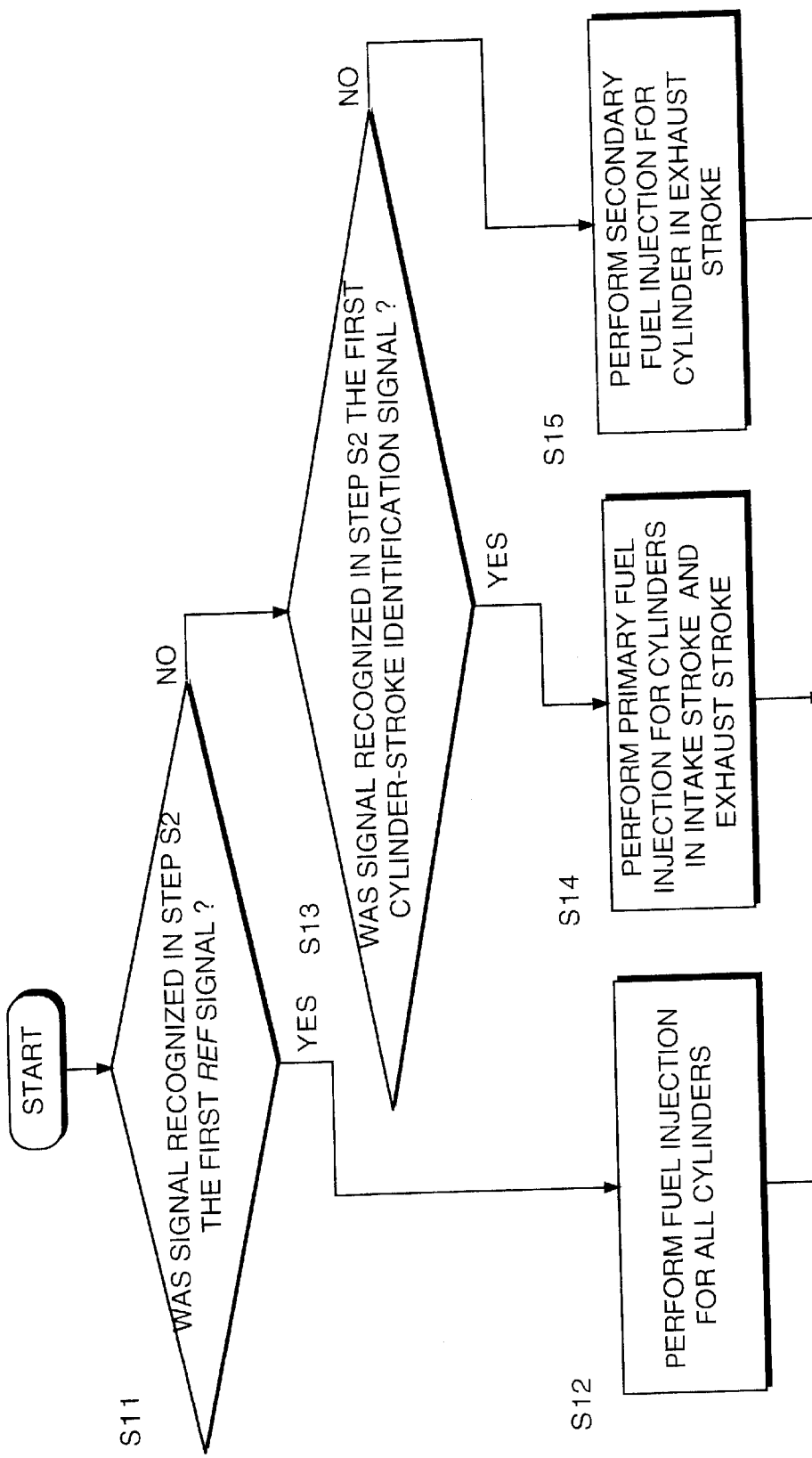
FIG. 5 is a flowchart describing a subroutine for performing fuel injection in a normal and a low temperature range executed by the controller.

When the water temperature TWINT at startup of cranking is not lower than –15° C., the controller 1 performs a fuel injection operation in the normal/low temperature range by performing a subroutine shown in FIG. 5 in a step S8.

After performing the process in the steps S8, S9 or S10, the controller 1 terminates the subroutine.

Next referring to FIG. 5, the fuel injection control subroutine for the preliminary and starting periods in the normal/low temperature range performed by the controller 1 in the step S8 of FIG. 4 will be described.

First, in a step S11, the controller 1 determines whether or not the signal determined in the step S2 of FIG. 3 was the first REF signal input since the first execution of the main routine.

This condition is only satisfied when the present occasion is in the preliminary period. When the condition is satisfied, the controller 1 performs fuel injection for all the cylinders simultaneously in a step S12. This process corresponds to the simultaneous injection for #1–#4 shown in FIGS. 15I–15L. The injection pulse width for the fuel injection performed in this step is the value previously calculated in the step S4 of the main routine.

When the condition in the step S11 is not satisfied, it means that the present occasion is in the starting period, and that the cylinder-stroke identification signal has been input after the immediately preceding occasion when the subroutine was performed. In this case, in a step S13, the controller 1 determines whether or not the signal determined in the step S2 of FIG. 3 Was the first cylinder-stroke identification signal.

When the determination result in the step S13 is affirmative, it means that it is a timing of the primary fuel injection in the starting period. In this case, in a step S14, the controller 1 immediately performs injection for the cylinder undergoing the intake stroke and the cylinder undergoing the exhaust stroke simultaneously. This operation is shown by the second injection for cylinders #1 and #3 in FIGS. 15I and 15K.

When the determination result in the step S13 is negative, it means that it is a timing of the secondary fuel injection in the starting period. In this case, in a step S15, the controller 1 makes the fuel injector 8 start fuel injection for the cylinder undergoing the exhaust stroke at a timing a predetermined period VDINJ1 offset from the input of the REF signal.

Figure 15:
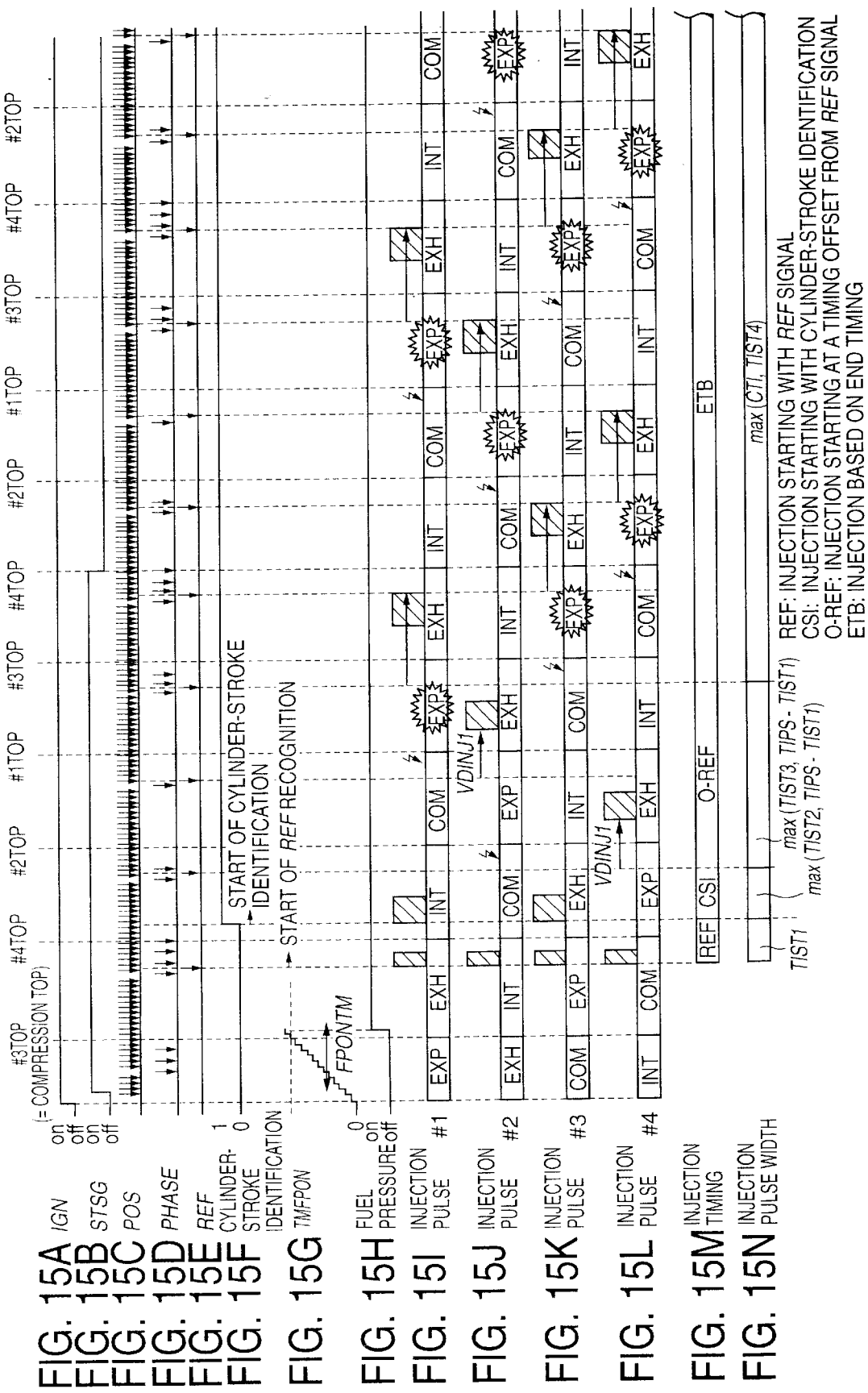
FIGS. 15A–15N are timing charts describing a fuel injection pattern in the low temperature range resulting from the fuel injection control by the controller.

This process corresponds to the second injection performed for cylinder #4 and the second injection performed for cylinder #2 as shown in FIGS. 15L and 15J. In the step S12 and S14, the controller 1 makes the fuel injector 8 start fuel injection immediately after the input of the REF signal. However in the step S15, the controller 1 makes the fuel injector 8 start fuel injection at a timing offset from the input of the REF signal.

After the process in any of the steps S12, S14 or S15 is performed, the controller terminates the subroutine.

Next referring FIG. 6, the fuel injection control subroutine for the preliminary and starting periods in the extremely low temperature range performed by the controller 1 in the step S9 of FIG. 4 will be described.

First, in a step S16, the controller 1 determines whether or not the signal determined in the step S2 of FIG. 3 was the first REF signal input since the first execution of the main routine. This determination is identical to that of the step S11 of FIG. 5.

Therefore, the condition is only satisfied when the present occasion is in the preliminary period. When the condition is satisfied, the controller 1 performs fuel injection for all the cylinders simultaneously in a step S17. This process is shown by the simultaneous injection for #1–#4 shown FIGS. 16I–16L. The injection pulse width for the fuel injection performed in this step is the value previously calculated in the step S4 of the main routine.

When the condition in the step S16 is not satisfied, it means that the present occasion is in the starting period, and that the cylinder-stroke identification signal has been input after the immediately preceding occasion when the subroutine was performed. In this case, in a step S18, the controller 1 determines whether or not the signal determined in the step S2 of FIG. 3 was the first cylinder-stroke identification signal.

When the determination result in the step S18 is affirmative, it means that it is a timing of the primary fuel injection in the starting period. In this case, in a step S19, the controller 1 immediately performs fuel injection for the cylinder undergoing the intake stroke. This operation is shown by the second injection for cylinder #1 in FIG. 16I.

When the determination result in the step S16 is negative, it means that it is a timing of the secondary fuel injection in the starting period. In this case, in a step S20, the controller 1 makes the fuel injector 8 start fuel injection for the cylinder undergoing the intake stroke at a timing a predetermined period VDINJ2 offset from the input of the REF signal.

Figure 16:
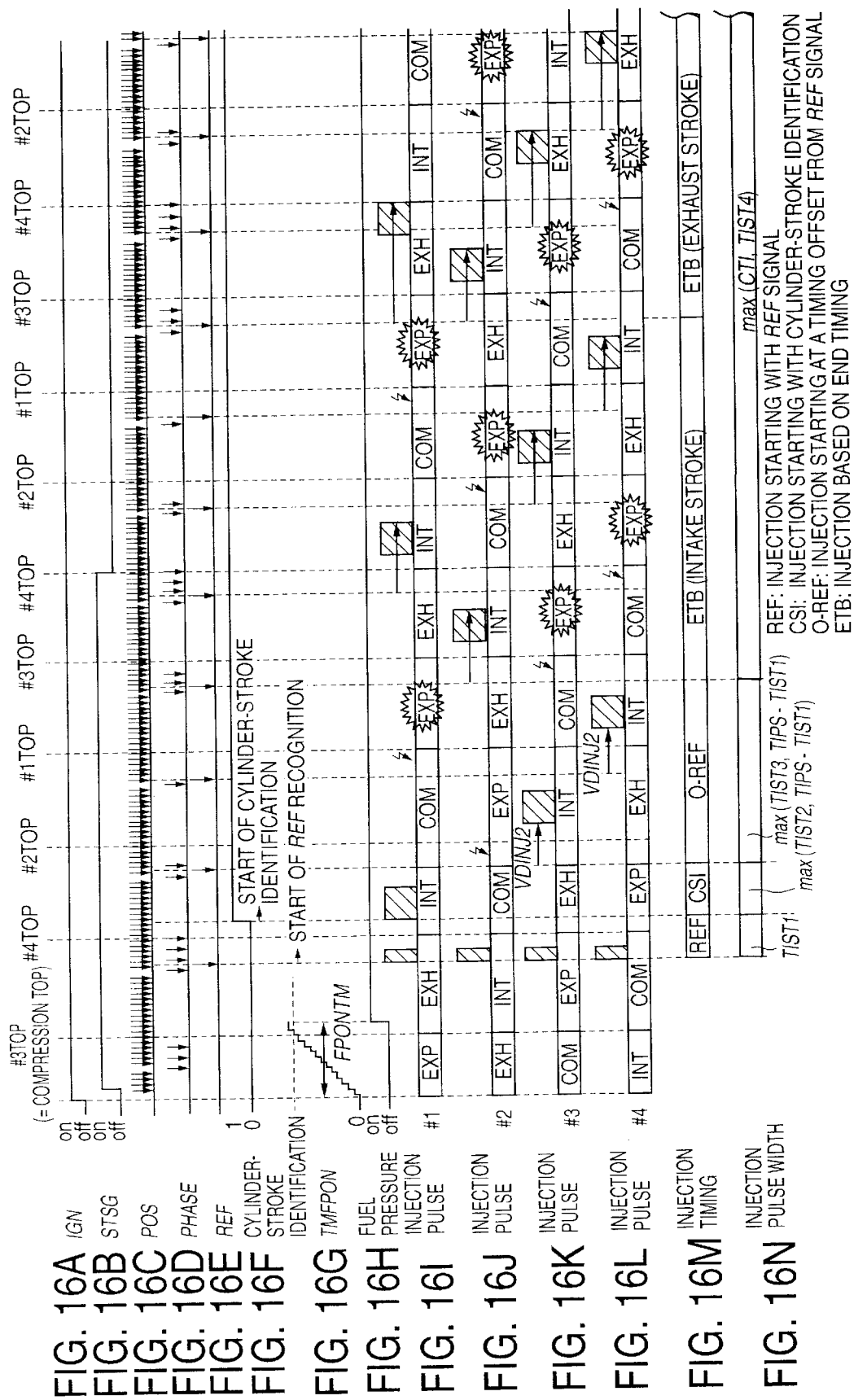
FIGS. 16A–16N are timing charts describing a fuel injection pattern in the extremely low temperature range resulting from the fuel injection control by the controller.
Figure 17:
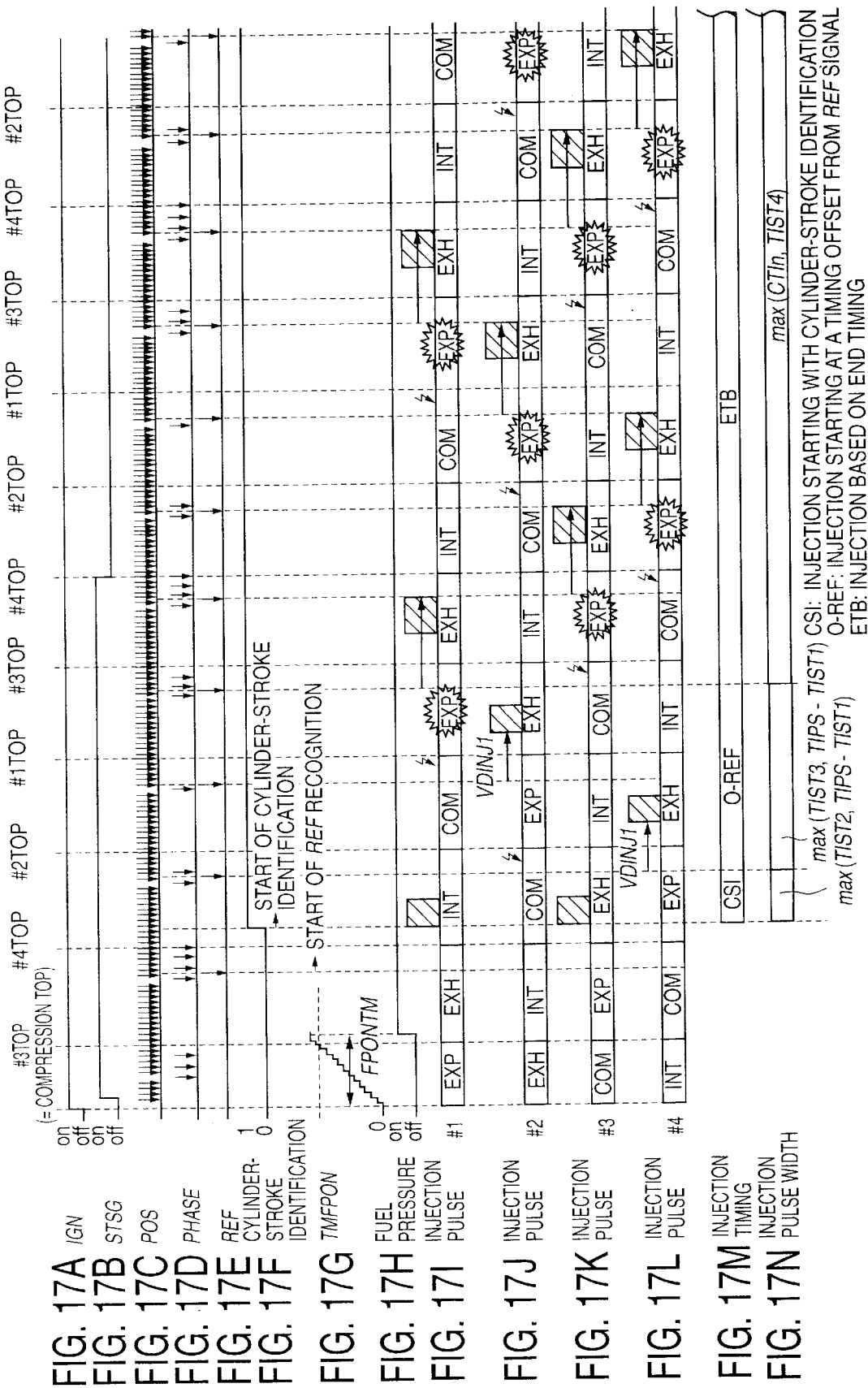
FIGS. 17A–17N are timing charts describing a fuel injection pattern in the normal temperature range resulting from the fuel injection control by the controller.

This process corresponds to the second injection performed on cylinder #3 and the second injection performed on cylinder #4 as shown in FIGS. 16K and 16L. In the step S17 and S19, the controller 1 makes the fuel injector start fuel injection immediately after the input of the REF signal. However in the step S20, the controller 1 makes the fuel injector 8 start fuel injection at a timing offset from the input of the REF signal.

After the process in any of the steps S17, S19 or S20 is performed, the controller terminates the subroutine.

Figure 7:
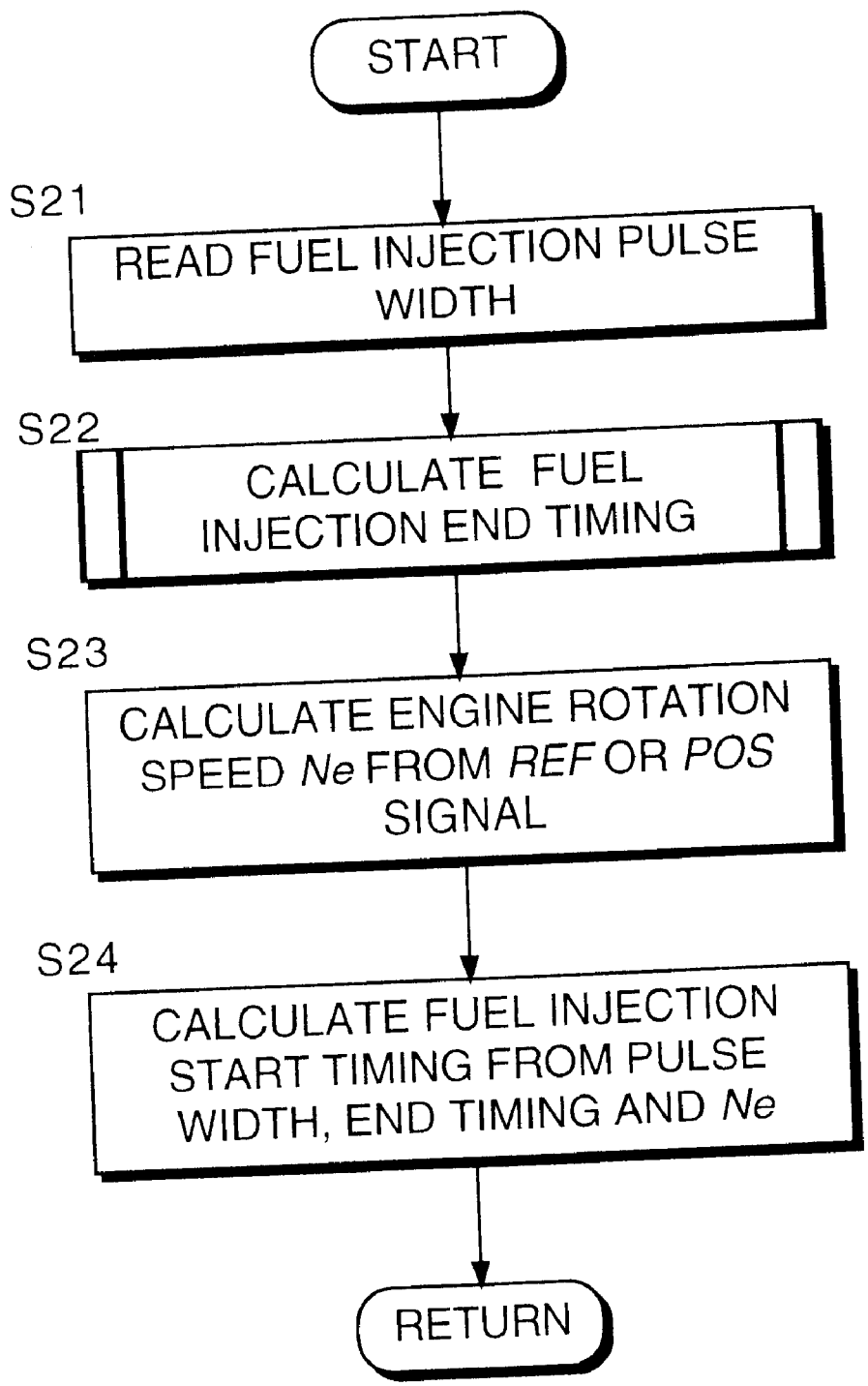
FIG. 7 is a flowchart describing a subroutine executed by the controller for performing fuel injection based on a fuel injection end timing.

Next referring FIG. 7, the fuel injection control subroutine in the normal operation period performed by the controller 1 in the step S10 of FIG. 4 will be described. In this subroutine, the controller 1 determines the fuel injection start timing on the basis of the fuel injection end timing.

First, in a step S21, the controller 1 reads the fuel injection pulse width. The value which is read out is a value calculated in the step S4 of FIG. 3 on the immediately preceding occasion when the main routine of FIG. 3 was performed.

Figure 8:
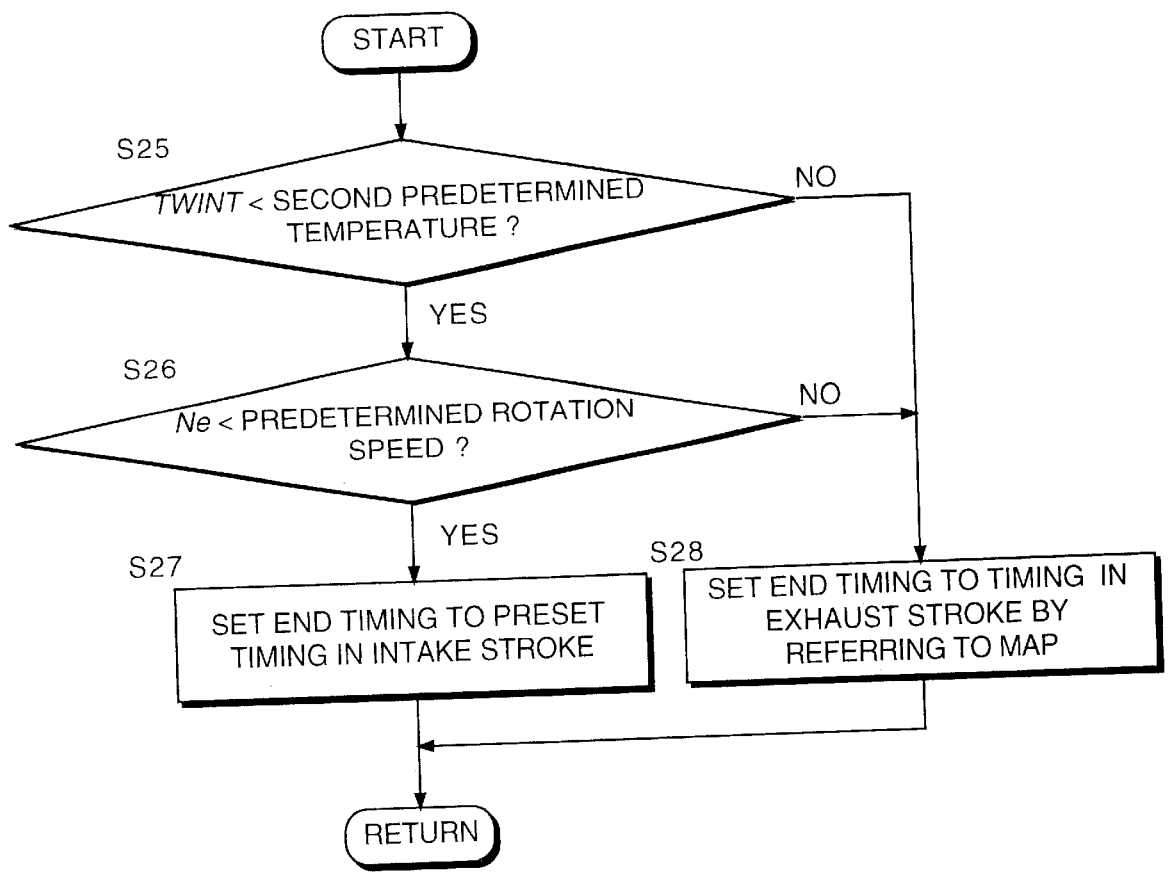
FIG. 8 is a flowchart describing a subroutine executed by the controller for calculating a fuel injection end timing.

Next in a step S22, a fuel injection end timing is calculated by executing a subroutine shown in FIG. 8.

In a next step S23, the rotation speed Ne of the engine 2 is calculated based on the REF signal or the POS signal.

In a next step S24, the fuel injection start timing is calculated on the basis of the fuel injection pulse width, the fuel injection end timing and the engine rotation speed.

After the process of the step S24, the controller 1 terminates the subroutine.

Now referring to FIG. 8, the calculation subroutine for the fuel injection end timing performed in the step S21 of FIG. 7 will be described. Control of the fuel injection operation based on the fuel injection end timing is only performed in the normal operation period as clearly shown by the process shown in FIG. 4 above. Thus this subroutine is only applied to fuel injection in the normal operation period.

First, in a step S25, the controller 1 compares the water temperature TWINT detected by the water temperature sensor 15 when cranking was started with a second predetermined temperature of −15° C. When TWINT is lower than the second predetermined temperature, the engine rotation speed Ne is compared with a predetermined rotation speed in a step S26. Herein, the predetermined rotation speed is a value for determining if the engine 2 has accomplished a complete combustion. In this subroutine, the predetermined rotation speed is set equal to 1000 rpm.

When the engine rotation speed is less than the predetermined rotation speed in the step S26, the target fuel injection end timing is set to a predetermined timing in the intake stroke in a step S27. The end timing of the fuel injection in the intake stroke during the normal operation period shown in FIGS. 16I–16L is the timing set in this step S27.

When the water temperature TWINT is not lower than the second predetermined temperature in the step S25, or when the engine rotation speed Ne is not less than the predetermined speed in the step S26, the controller 1 sets the fuel injection end timing in a step S28 to a timing in the exhaust stroke according to the engine rotation speed Ne by looking up a map prestored in the memory. The end timing of the fuel injection in the exhaust stroke during the normal operation period shown in FIGS. 16I–16L is the timing set in the step S28.

After the process in the step S27 or S28 is performed, the controller 1 terminates the subroutine.

Figure 9:
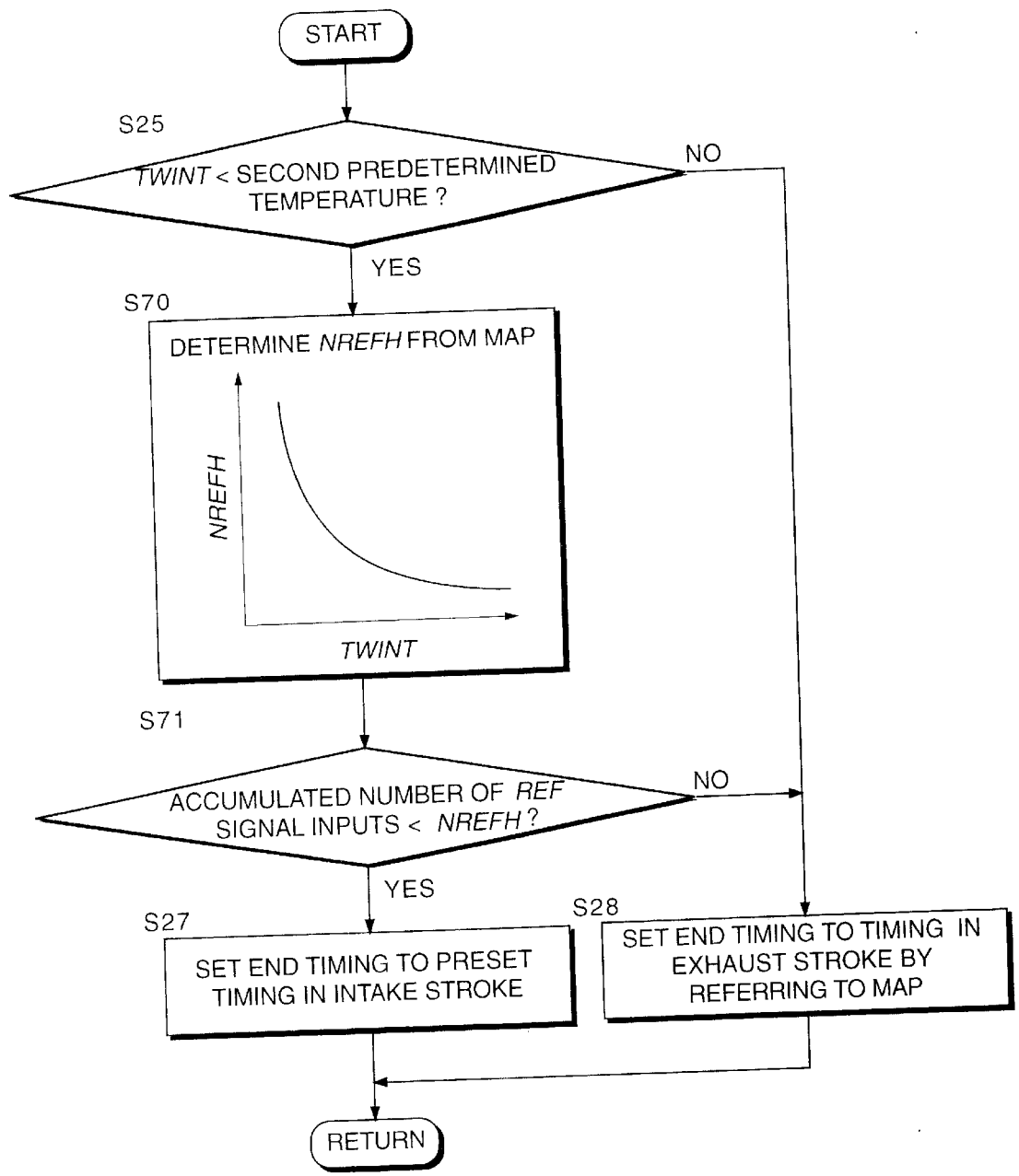
FIG. 9 is similar to FIG. 8, but showing another embodiment of this invention related to the calculation of the fuel injection end timing.

Next referring to FIG. 9, another embodiment with respect to the calculation subroutine of the fuel injection end timing will be described.

The process performed in the step S25, S27 and S28 is the same as those performed in the subroutine of FIG. 8.

The controller 1 performs the process of steps S70 and S71 instead of the step S26 when the water temperature TWINT at startup of cranking is lower than the second predetermined temperature in the step S25.

In the step S71, the accumulated number of REF signal inputs is compared with a reference value NREFH. Herein, the accumulated number of REF signal inputs is the value used in the step S6 of FIG. 4.

The reference value NREFH is the value calculated in the preceding step S70 for determining if the fuel injection end timing should be switched over from the intake stroke to the exhaust stroke. The calculation is performed by looking up a prestored map in the memory from the water temperature TWINT at startup of cranking. As shown in FIG. 9, the reference value NREFH increases as the water temperature TWINT decreases.

When the accumulated number of REF signal inputs is less than the reference value NREFH in the step S71, the process of the step S27 is performed. On the other hand, when the accumulated number of REF signal inputs is not less than the reference value NREFH, the process of the step S28 is performed.

After performing the process in the step S27 or S28, the controller 1 terminates the subroutine.

In the subroutine in FIG. 8, after the engine rotation speed Ne reaches the predetermined rotation speed irrespective of the water temperature TWINT at cranking start, the fuel injection end timing is switched over from the intake stroke to the exhaust stroke. In this subroutine, however, the switching-over of the fuel injection end timing from the intake stroke to the exhaust stroke is delayed the lower the water temperature TWINT at startup of cranking.

Since fuel injection in the exhaust stroke is performed in the state where the intake valve is closed, there is a tendency that the injected fuel adheres to the valve body and increases wall flow. Thus when the water temperature TWINT at startup of cranking is low, it is preferable to delay the switching-over of the fuel injection end timing from the intake stroke to the exhaust stroke in order to stabilize the engine operation. The subroutine of FIG. 9 has been developed to meet this requirement.

Referring now to FIG. 10, the subroutine for calculating the fuel injection pulse width executed by the controller 1 in the step S4 of FIG. 3 will be described.

First, in a step S29, the controller 1 determines whether or not the first REF signal after startup of cranking has been input. When the first REF signal after startup of cranking has not been input, the injection pulse width for the simultaneous fuel injection to all the cylinders during the preliminary period is calculated in a step S35 by a subroutine shown in FIG. 11.

When the first REF signal after startup of cranking has already been input, in a step S30, the controller 1 determines whether or not the first cylinder-stroke identification signal has been input. When the first cylinder-stroke identification signal has not been input, in a step S34, the pulse width for the primary fuel injection is calculated by a subroutine shown in FIG. 12.

In contrast, when the first cylinder-stroke identification signal has already been input, the controller 1 determines whether or not the fuel injection during the starting period has completed in a step S31. This determination is the same as the determination performed in the step S6 of FIG. 4.

When the fuel injection during the starting period has not completed yet, in a step S33, the controller 1 calculates the pulse width for the secondary fuel injection is calculated by a subroutine shown in FIG. 33.

Figure 14:
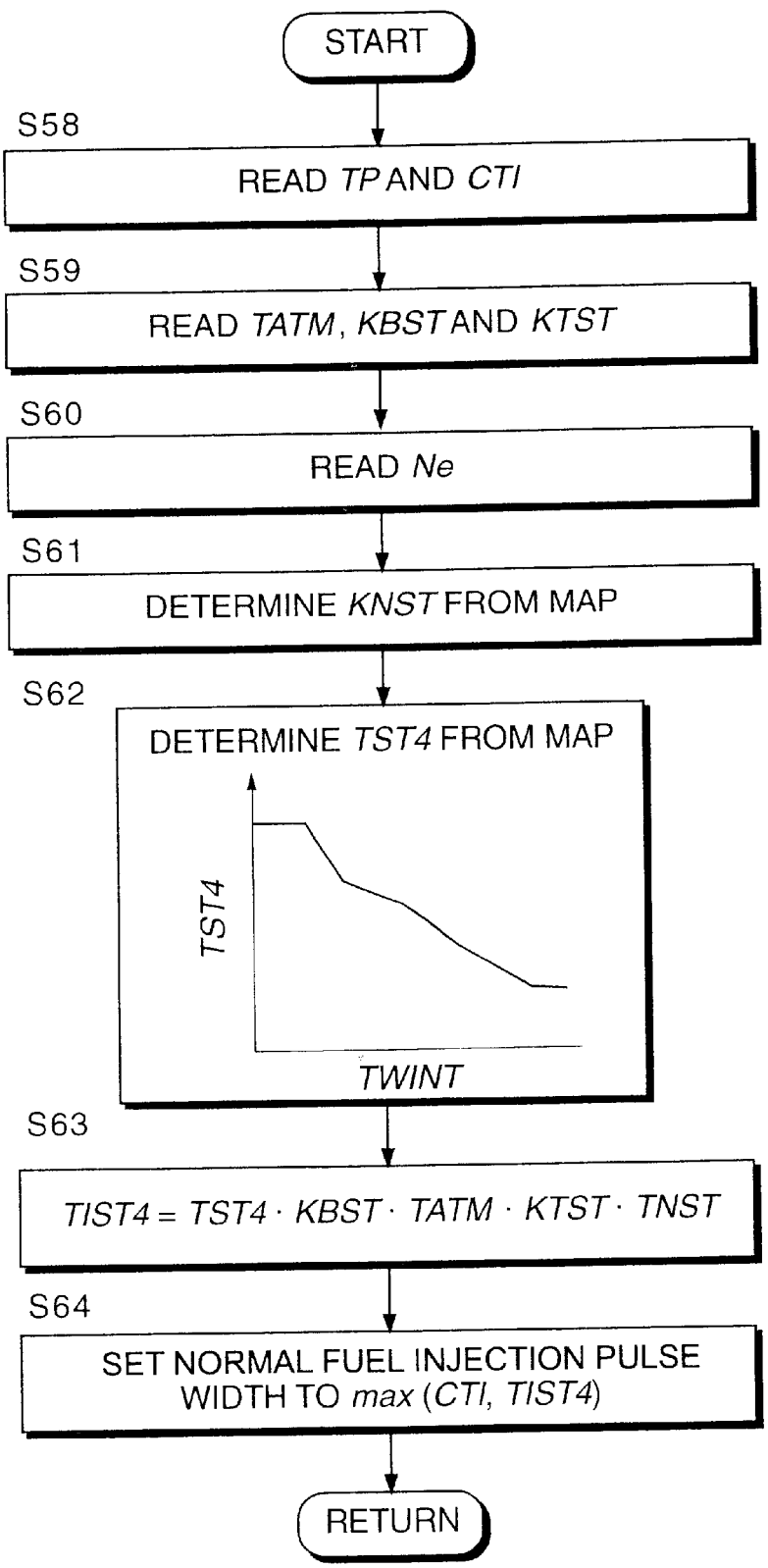
FIG. 14 is a flowchart describing a subroutine executed by the controller for calculating a fuel injection pulse width in a normal operation period.

On the other hand, when the fuel injection during the starting period has completed, in a step S32, the controller 1 calculates the fuel injection pulse width for the normal operation period is calculated by a subroutine shown in FIG. 14.

After the fuel injection pulse width is calculated from any of the steps S32 through S35, the controller 1 terminates the subroutine.

Figure 11:
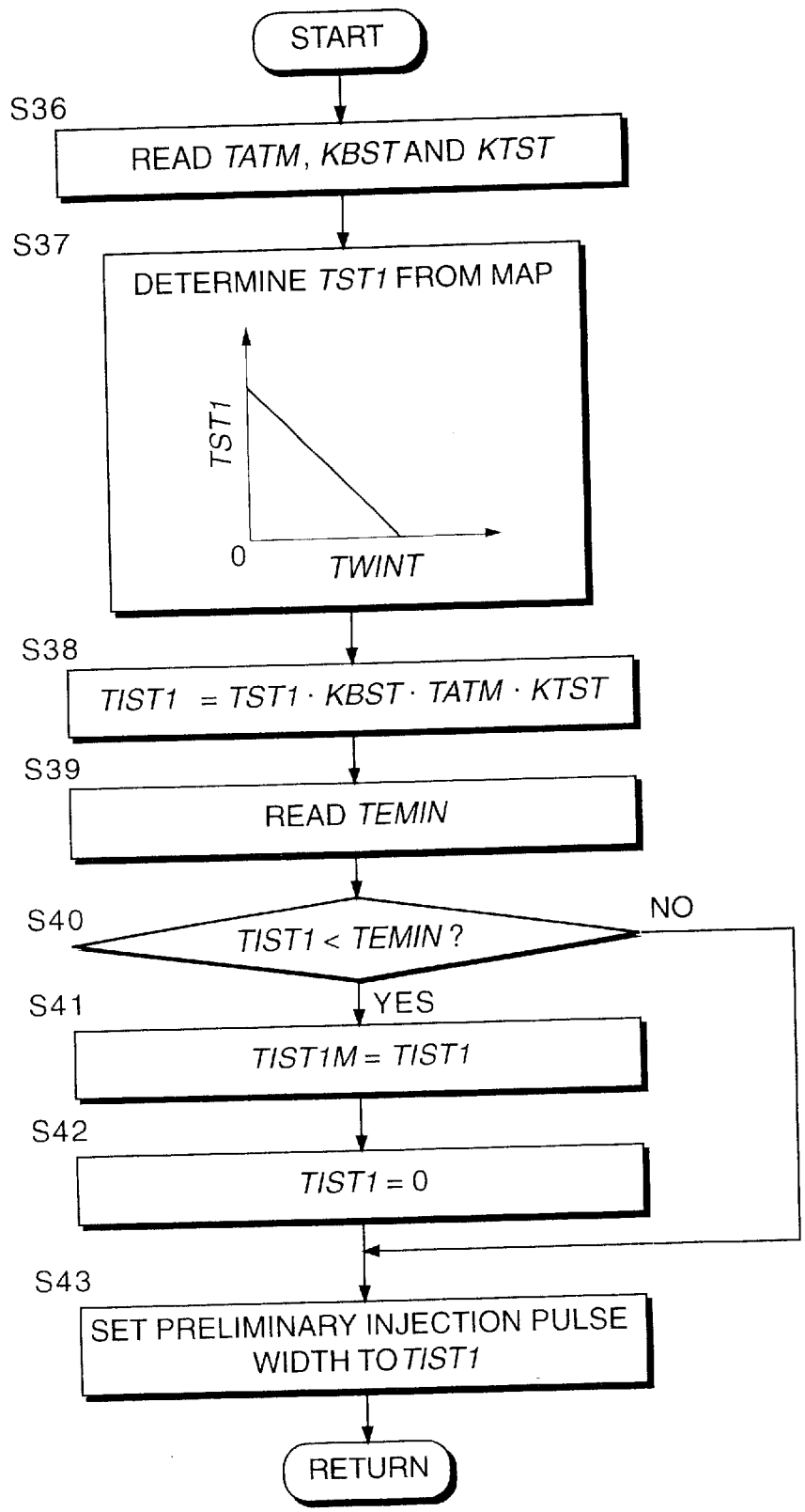
FIG. 11 is a flowchart describing a subroutine executed by the controller for calculating a fuel injection pulse width of a preliminary fuel injection.

Referring to FIG. 11, the subroutine for calculating the pulse width for the simultaneous fuel injection during the preliminary period that is performed in the step S35 of FIG. 10 will be described.

First, in a step S36, the controller 1 reads correction coefficients related to the fuel injection pulse width. The correction coefficients include an atmospheric pressure correction coefficient TATM for correcting variation in the mass of air resulting from variation in the atmospheric pressure, an intake pressure correction coefficient KBST which corrects the variation in the different between the fuel pressure of the fuel pump and the nozzle pressure of the fuel injector 8 resulting from the pressure variation in the intake pipe 3, and a time correction coefficient KTST for correcting variation in the fuel vaporization ratio resulting from temperature variation in the intake valve 18 according to the elapsed time after startup of cranking.

Then in a step S37, the controller 1 calculates a basic value TIST1 for the preliminary fuel injection by looking up a map which is prestored in the memory from the water temperature TWINT at startup of cranking. As shown in the figure, the basic value TIST1 increases as the water temperature TWINT at startup of cranking decreases.

It should be noted that, when the water temperature TWINT at startup of cranking is not lower than a first predetermined temperature of 10° C., the basic value TIST1 takes a value of zero.

In the low temperature range or extremely low temperature range, the fuel injection amount required for the fuel injection in the starting period is so large that the fuel injection amount that can be injected during the starting period may not meet the requirement. The preliminary fuel injection has a purpose of supplying fuel to prevent the shortage of fuel when the first combustion is performed as well as to form a wall flow.

Due to the above reason, the map of TIST1 has been arranged such that the basic value TIST1 takes a larger value the lower the water temperature TWINT at startup of cranking. The map is prepared through a comparison of the required fuel injection amount in the low and extremely low temperature ranges with a physical limit of the fuel injector 8 with respect to the fuel injection amount.

In a next step S38, the controller 1 calculates a fuel injection pulse width TIST1 for the preliminary fuel injection by multiplying the basic value TIST1 by the coefficients above.

In a next step S39, a minimum fuel injection pulse width TEMIN is read. The minimum fuel injection pulse width TEMIN represents the minimum value of the pulse width that can be handled by the fuel injector 8.

In a step S40, the fuel injection pulse width TIST1 for the preliminary fuel injection is compared with the minimum pulse width TEMIN. When the fuel injection pulse width TIST1 is smaller than the minimum pulse width TEMIN, it means that the fuel injection amount is too small to be handled by fuel injector 8. Consequently the controller 1 stores the fuel injection pulse width TIST1 as a stored value TIST1M in a step S41, and in a subsequent step S42, the fuel injection pulse width TIST1 is set to zero. The stored value TIST1M is added to the fuel injection pulse width in the next occasion fuel injection is performed. After the process of the step S42, the controller 1 executes the process of a step S43.

In the step S40, when the fuel injection pulse width TIST1 is not smaller than the minimum pulse width TEMIN, the controller 1 skips the process of the steps S41 and S42 and proceeds to the process of the step S43.

In the step S43, the preliminary fuel injection pulse width is set equal to the pulse width TIST1. After this process, the controller 1 terminates the subroutine.

According to this subroutine, The value of TIST1 varies in response to the water temperature TWINT at startup of cranking. When the water temperature TWINT at startup of cranking is higher than the first predetermined temperature, TIST1 takes a value of zero. As a result, when the water temperature TWINT at startup of cranking is higher than the first predetermined temperature of 10° C., the preliminary fuel injection, i.e., the simultaneous fuel injection to all the cylinders in the preliminary period is not performed as shown in FIGS. 17I–17L.

Figure 12:
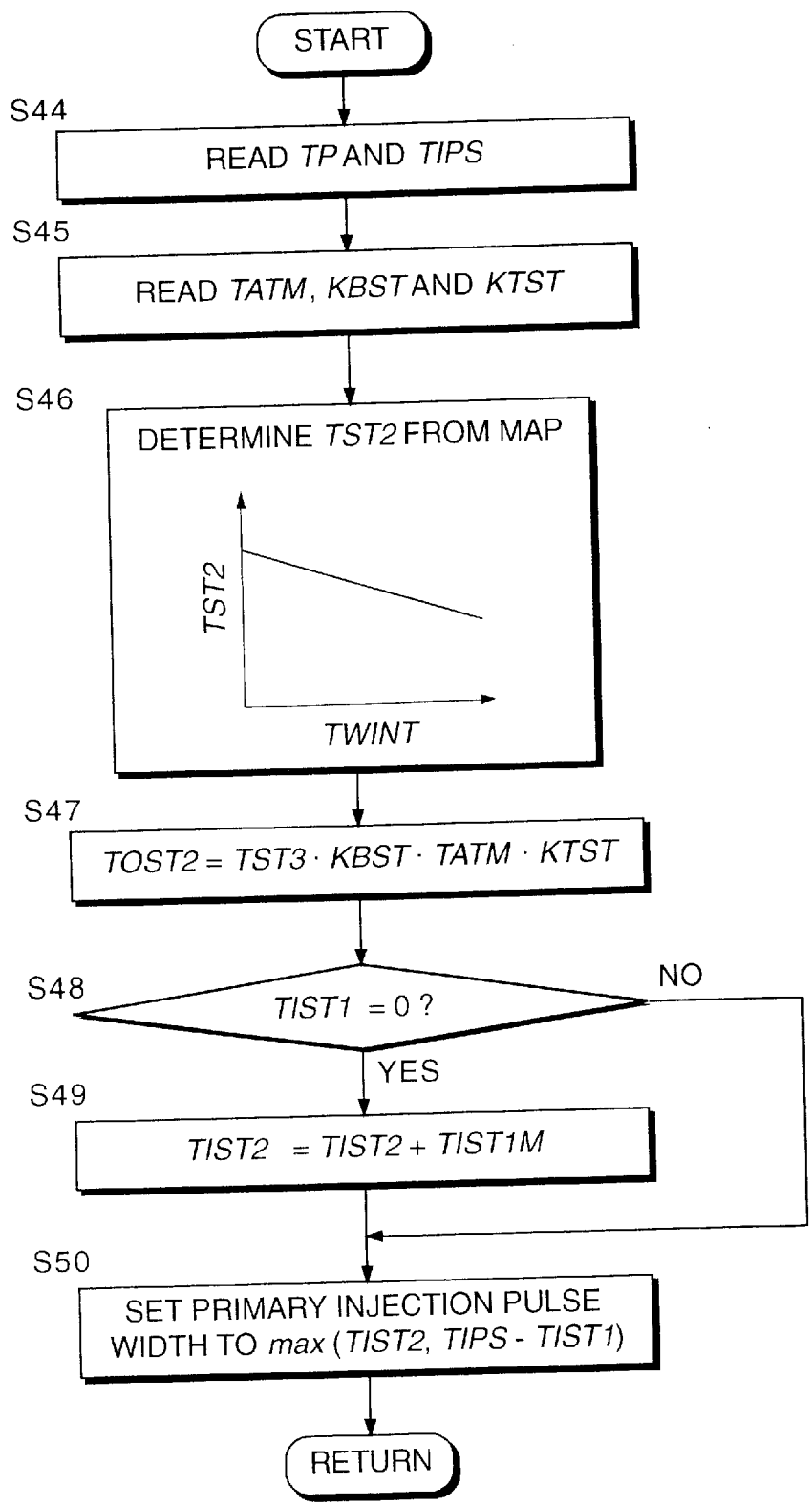
FIG. 12 is a flowchart describing a subroutine executed by the controller for calculating a fuel injection pulse width of a primary fuel injection in a starting period.

Referring now to FIG. 12, the subroutine for calculating the primary fuel injection pulse width in the starting period that is performed in the step S34 of FIG. 10 will be described.

First, in a step S44, the controller 1 reads the target fuel injection pulse width TIPS that was calculated in another routine based on a target equivalence ratio TFBYA and the basic injection pulse width TP. Since the calculation of the basic injection pulse width TP, the target equivalence ratio TFBYA and the calculation of the target fuel injection pulse width TIPS based on these two values are known from U.S. Pat. No. 5,615,660, the calculation process of these values are omitted in this description.

In a next step S45, the atmospheric pressure correction coefficient TATM, the intake air pipe pressure correction coefficient KBST and the time correction coefficient KTST described above are read.

In a next step S46, the controller 1 calculates a basic value TST2 for the primary fuel injection pulse width in the starting period by looking up a map prestored in the memory based on the water temperature TWINT at startup of cranking. The basic value TST2 takes larger values the lower the water temperature TWINT at startup of cranking as shown in the figure.

In a next step S47, the controller 1 calculates the primary fuel injection pulse width TIST2 for the starting period by multiplying the basic value TST2 by the above coefficients.

In a next step S48, it is determined whether or not the preliminary fuel injection pulse width TIST1 set in the subroutine of FIG. 11 has a value of zero.

When the preliminary fuel injection pulse width TIST1 is zero, in a step S49, the stored value TIST1M set in the step S41 of FIG. 11 is added to the value for TIST2 and the resulting value is set as the primary fuel injection pulse width TIST2 for the starting period. After the process of the step S49, the controller 1 performs the process of the step S50.

When on the other hand the preliminary fuel injection pulse width TIST1 is not zero, the step S49 is skipped and the process in the step S50 is performed.

In the step S50, the controller 1 compares the primary fuel injection pulse width TIST2 for the starting period with a value Obtained by subtracting the primary fuel injection pulse width TIST1 from the target fuel injection pulse width TIPS read in the step S44. The preliminary fuel injection pulse width TIST1 is the value calculated in the subroutine of FIG. 11. After the comparison, the larger of the two values is set as the primary fuel injection pulse width for the starting period.

The process in the step S50 has the following meaning.

The primary fuel injection pulse width TIST2 for the starting period does not depend on the intake air amount of the engine 2 as clearly shown by its process of determination. On the other hand, when the intake air amount of the engine 2 varies, the fuel injection amount must be varied in order to maintain a target air-fuel ratio of the air-fuel mixture. Thus when the intake air amount of the engine 2 has been varied, the air-fuel ratio of the air-fuel mixture fluctuates if the fuel injection is performed according only to the value for TIST2. Consequently adverse effects result in view of the stability of combustion or the exhaust emission components of the engine 2.

In the step S50, a fuel injection pulse width required for the current fuel injection is calculated by subtracting the injection pulse width TIST1 already injected by the preliminary fuel injection from the target fuel injection pulse width TIPS set in response to the intake air amount, and then the primary fuel injection pulse width TIST2 in the starting period is adapted not to fall below the calculated pulse width.

After the process in the step S50, the controller 1 terminates the subroutine.

Figure 13:
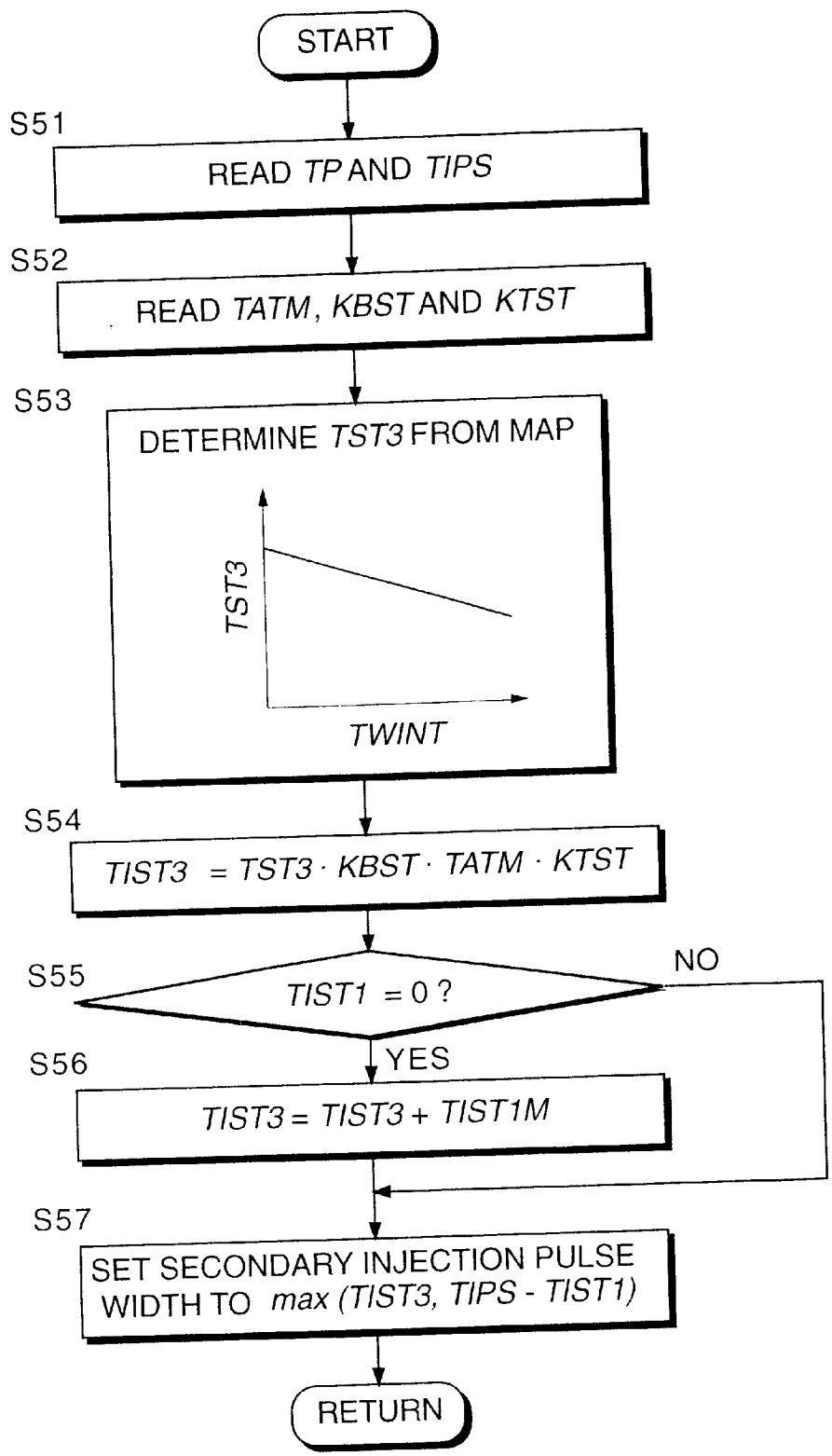
FIG. 13 is a flowchart describing a subroutine executed by the controller for calculating a fuel injection pulse width of a secondary fuel injection in the starting period.

Referring now to FIG. 13, the subroutine for calculating the secondary fuel injection pulse width for the second or subsequent fuel injection occasion in the starting period that is performed in the step S33 of FIG. 10 will be described.

First, in a step S51, the target fuel injection pulse width TIPS is read in the same manner as the step S44 of the FIG. 12.

In a next step S52, the atmospheric pressure correction coefficient TATM, the intake air pipe pressure correction coefficient KBST and the time correction coefficient KTST are read in the same manner as the step S45 of FIG. 12.

In a next step S53, the controller 1 calculates a basic value TST3 for the secondary fuel injection pulse width for the second or subsequent fuel injection occasion in the starting period by looking up a map prestored in the memory based on the water temperature TWINT at startup of cranking. The basic value TST3 takes larger values the lower the water temperature TWINT at startup of cranking as shown in the figure.

In a next step S54, the controller 1 calculates the secondary fuel injection pulse width TIST3 for the starting period by multiplying the basic value TST3 by the various coefficients above.

In a next step S55, it is determined whether or not the preliminary fuel injection pulse width TIST1set in the subroutine of FIG. 11 has a value of zero.

When the preliminary fuel injection pulse width TIST1 is zero, in a step S56, the stored value TIST1M set in the step S41 of FIG. 11 is added to the value for TIST3 and the resulting value is set as the secondary fuel injection pulse width TIST3 on the second or subsequent fuel injection occasion for the starting period. After the process of the step S56, the controller performs the process in the step S57.

When on the other hand the preliminary fuel injection pulse width TIST1 is not zero, the step S56 is skipped and the process in the step S50 is performed.

In the step S57, the controller 1 compares the secondary fuel injection pulse width TIST3 with a value obtained by subtracting the preliminary fuel injection pulse width TIST1 from the target fuel injection pulse width TIPS read in the step S51. The preliminary fuel injection pulse width TIST1 is the value calculated in the subroutine of FIG. 11. The larger of the two values is then set as the secondary fuel injection pulse width for the second or subsequent fuel injection occasion in the starting period.

After performing the process of the step S50, the controller 1 terminates the subroutine.

Referring now to FIG. 14, the subroutine for calculating the fuel injection pulse width for the normal operation period performed in the step S32 of FIG. 10 will be described. The fuel injection pulse width in the normal operation period is herein after referred to as a normal fuel injection pulse width.

First, in a step S58, the controller 1 reads the target fuel injection pulse width CTI for each cylinder. The target fuel injection pulse width CTI for each cylinder is a value which is determined in response to the intake air amount Qc in the same manner as the target fuel injection pulse width TIPS described above. The calculation of the target injection pulse width CTI for each cylinder is known from U.S. Pat. No. 5,404,862.

In a next step S59, the atmospheric pressure correction coefficient TATM, the intake air pipe pressure correction coefficient KBST and the time correction coefficient KTST are read in the same manner as the step S45 of FIG. 12.

In a next step S60, the controller 1 reads the rotation speed Ne of the engine 2.

In a next step S61, a rotation speed correction coefficient KNST is calculated by looking up a map prestored in the memory based on the rotation speed Ne of the engine 2. The rotation speed correction coefficient KNST is a coefficient which corrects effects of variation in the engine rotation speed on the fuel injection pulse width.

In a step S62, the controller 1 calculates a basic value TST4 for the normal fuel injection pulse width by looking up a map prestored in the memory based on the water temperature TWINT at startup of cranking. The basic value TST4 takes larger values the lower the water temperature TWINT at startup of cranking as shown in the figure.

In a next step S63, the controller 1 calculates the normal fuel injection pulse width TIST4 by multiplying the basic value TST4 by the various coefficients above.

In a next step S64, the target fuel injection pulse width CTI is compared with the normal fuel injection pulse width TIST4 and the larger of the two values is set as the normal fuel injection pulse width. After the step S63, the controller 1 terminates the subroutine.

The result of the above control routines performed by the controller 1 is that the preliminary fuel injection is performed for all the cylinders for the first time when the first REF signal is input and the water temperature TWINT at startup of cranking is not larger than the first predetermined temperature of 10° C. In the normal temperature range in which the water temperature TWINT at startup of cranking is not lower than the first predetermined temperature, the preliminary fuel injection is not performed.

Next, when the first cylinder-stroke identification signal is input, if the water temperature TWINT at startup of cranking is not lower than the second predetermined temperature of −15° C., fuel injection is performed simultaneously for the cylinder undergoing the intake stroke and the cylinder undergoing the exhaust stroke when the cylinder-stroke identification signal is input. In the extremely low temperature range in which the water temperature TWINT at startup of cranking is lower than the second predetermined temperature of −15° C., fuel injection is performed only for the cylinder undergoing the exhaust stroke.

Thereafter, fuel injection is performed sequentially on each occasion a cylinder-stroke identification signal is input until the accumulated number of REF signal inputs reaches a value of four. However when the water temperature TWINT at startup of cranking is not lower than the second predetermined temperature of −15° C., fuel injection is performed for the cylinder undergoing the exhaust stroke when the cylinder-stroke identification signal is input. In the extremely low temperature range in which the water temperature TWINT at startup of cranking is lower than the second predetermined temperature of −15° C., fuel injection for the cylinder undergoing the intake stroke is performed when a cylinder-stroke identification signal is input.

When the accumulated number of REF signal inputs reaches the value of four, fuel injection for normal operation period is performed sequentially for each cylinder. In this fuel injection, firstly the fuel injection end timing and the injection pulse width for each cylinder are determined. Then the fuel injection start timing is determined by subtracting the injection pulse width from the fuel injection end timing.

This fuel injection is performed for each cylinder that undergoes the exhaust stroke when the water temperature TWINT at startup of cranking is not lower than the second predetermined temperature of −15° C. In the extremely low temperature range in which the water temperature TWINT at startup of cranking is lower than the second predetermined temperature of −15° C., however, fuel injection is performed in response to the engine rotation speed. That is to say, when the engine rotation speed is less than the predetermined speed, fuel injection is performed for the cylinder undergoing the intake stroke. After the engine rotation speed reaches the predetermined rotation speed, fuel injection is performed for the cylinder undergoing the exhaust stroke in the same manner as when the water temperature TWINT at startup of cranking is note lower than the second predetermine temperature of −15° C.

Referring to FIGS. 15I–15L, FIGS. 16I–16L and FIGS. 17I–17L, the first combustion takes place in cylinder #1. When the first cylinder-stroke identification signal is input to the controller 1, the cylinder #1 is undergoing the intake stroke. If the primary fuel injection is not performed for the cylinder undergoing the intake stroke, only the fuel injected by the preliminary fuel injection is burnt by the first combustion in the cylinder #1. This may result in an extremely lean air-fuel ratio of the air-fuel mixture and make the combustion unstable.

According to this invention, however, the primary fuel injection for the cylinder in the intake stroke is performed in any temperature range, so every cylinder undergoes fuel injection other than the preliminary fuel injection before it performs the first combustion. As a result, insufficiency of fuel in a specific cylinder when cranking the engine 2 is prevented, and the stability of combustion of the engine 2 during crank up is increased. As a result, the time required for cranking can be shortened and toxic components in the exhaust gas discharged from the engine 2 during start-up are also reduced.

Furthermore, since the preliminary fuel injection is performed for all the cylinders in the low temperature range and the extremely low temperature range before the input of the first cylinder-stroke identification signal, fuel injection amount required for the first combustion is ensured in every cylinder irrespective of the water temperature at startup of cranking.

Next a second embodiment of this invention will be described.

This embodiment is related to the application of this invention to a four-stroke cycle V-type eight-cylinder engine provided with cylinders #1-#8. In this eight-cylinder engine, the PHASE signal is input into the controller 11 every time when the engine rotates ninety degrees in the order of #1-#8-#7-#3-#6-#5-#4-#2. In the following description, the components of the engine that are identical to those of the engine 1 of the first embodiment will have the same numerals.

In this eight-cylinder engine, providing that the cylinders #1 and #8 are in the exhaust stroke when the preliminary fuel injection is performed for all the cylinders, the cylinders #4 and #2 are in the intake stroke. During the intake stroke, the intake valve 18 is open, so the fuel injected from the fuel injector 15 is immediately aspirated into the combustion chamber 6 and most of the fuel is discharged from the combustion chamber 6 from the exhaust valve 19 when it opens in the following exhaust stroke. As for the other cylinders, the preliminary fuel injection is performed with the intake valve 19 closed, so the fuel injected from the fuel injector 15 will not be aspirated into the combustion chamber until the intake valve 18 opens. Thus, the fuel injected by the preliminary fuel injection for these cylinders will not be discharged from the combustion chamber in these cylinders in the next exhaust stroke.

Even in for the cylinders #4 and #2, if the preliminary fuel injection is performed in the later period of the intake stroke, most of the fuel will remain in the intake port 7 without being aspirated into the combustion chamber 6 due to the reason that the intake valve 18 closes immediately after the preliminary fuel injection. In the case of a four-cylinder engine as that of the first embodiment, the intake stroke of a cylinder does not overlap with ti hat of the other cylinders. In a four-cylinder engine, therefore, it is possible to set the fuel injection timing of the preliminary fuel injection to prevent the injected fuel form being discharged from the exhaust valve 19 when it opens in the exhaust stroke.

Figure 26:
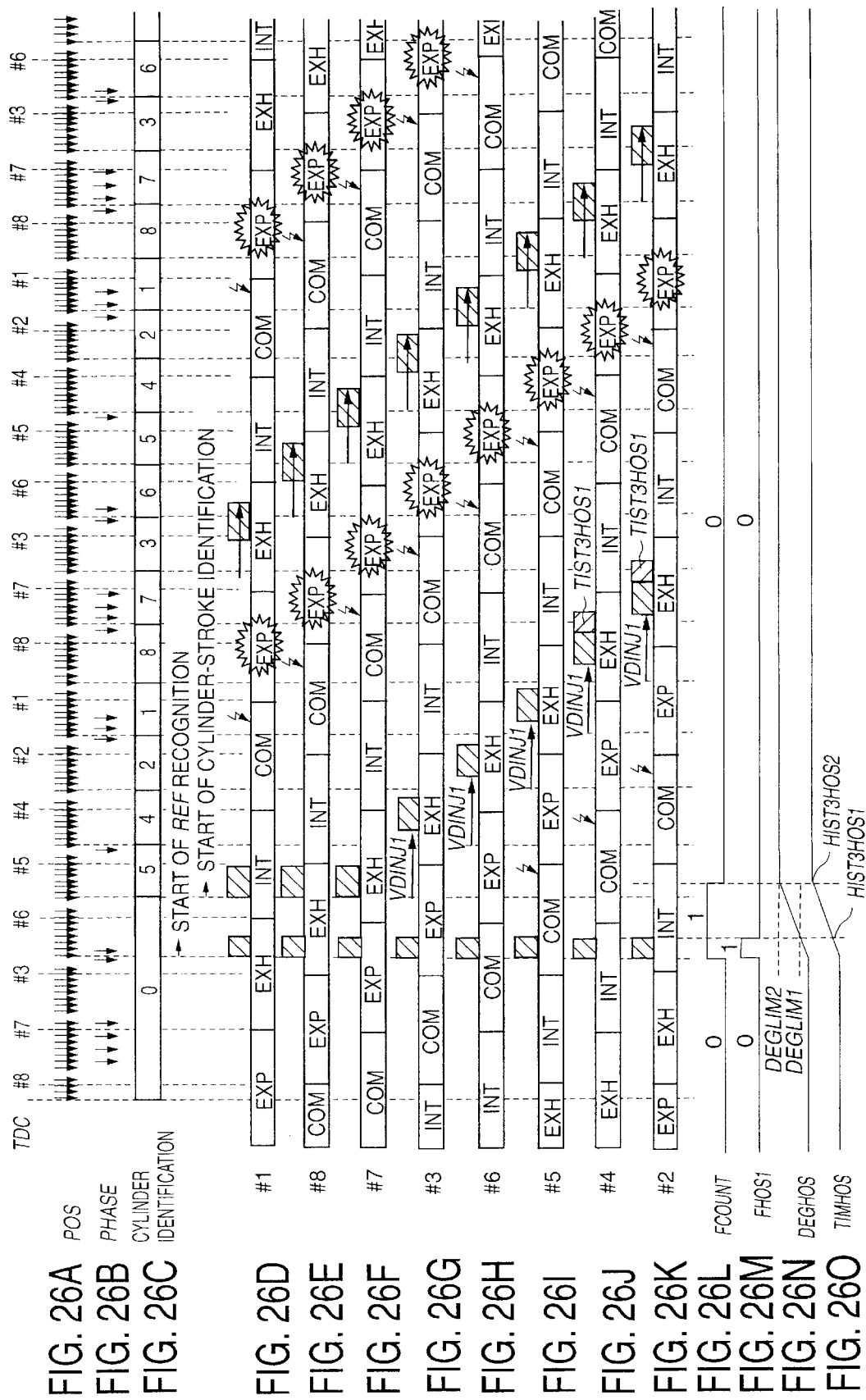
FIGS. 26A–26O are timing charts for describing a fuel injection pattern in the low temperature range according to the second and third embodiments of this invention.

In an engine provided with more than five cylinders, however, overlapping of the intake stroke between two cylinders is inevitable as shown in FIGS. 26J and 26K where the preliminary fuel injection is performed when the cylinder #4 is in a later period in the intake stroke and the cylinder #2 is in an earlier period in the same stroke.

In such a multi-cylinder engine, it is impossible to prevent the injected fuel from being discharged from every cylinder only by only the setting of the fuel injection timing. As a result, in this eight-cylinder engine, when the first combustion is performed in these cylinders #4 and #2, the air-fuel ratio of the air-fuel mixture will be leaner than in the other cylinders and ignition failure may be anticipated.

This embodiment prevents the air-fuel ratio of the mixture from becoming lean when the first combustion takes place in these cylinders by increasing the fuel injection amount in the starting period in these cylinders.

As can be understood from FIGS. 26D–26K, the cylinders #2 and #4 are the last and the second last cylinders amount the eight cylinders #1-#8 in view of the order of the first combustion when the engine is cranked up. It should be noted that in these cylinders, the spark plug 14 sparks in the first compression stroke, but since it is before the fuel injection in the starting period, there is not enough fuel in the cylinder, so combustion is not take place with the first spark in these cylinders #2 and #4.

Figure 18:
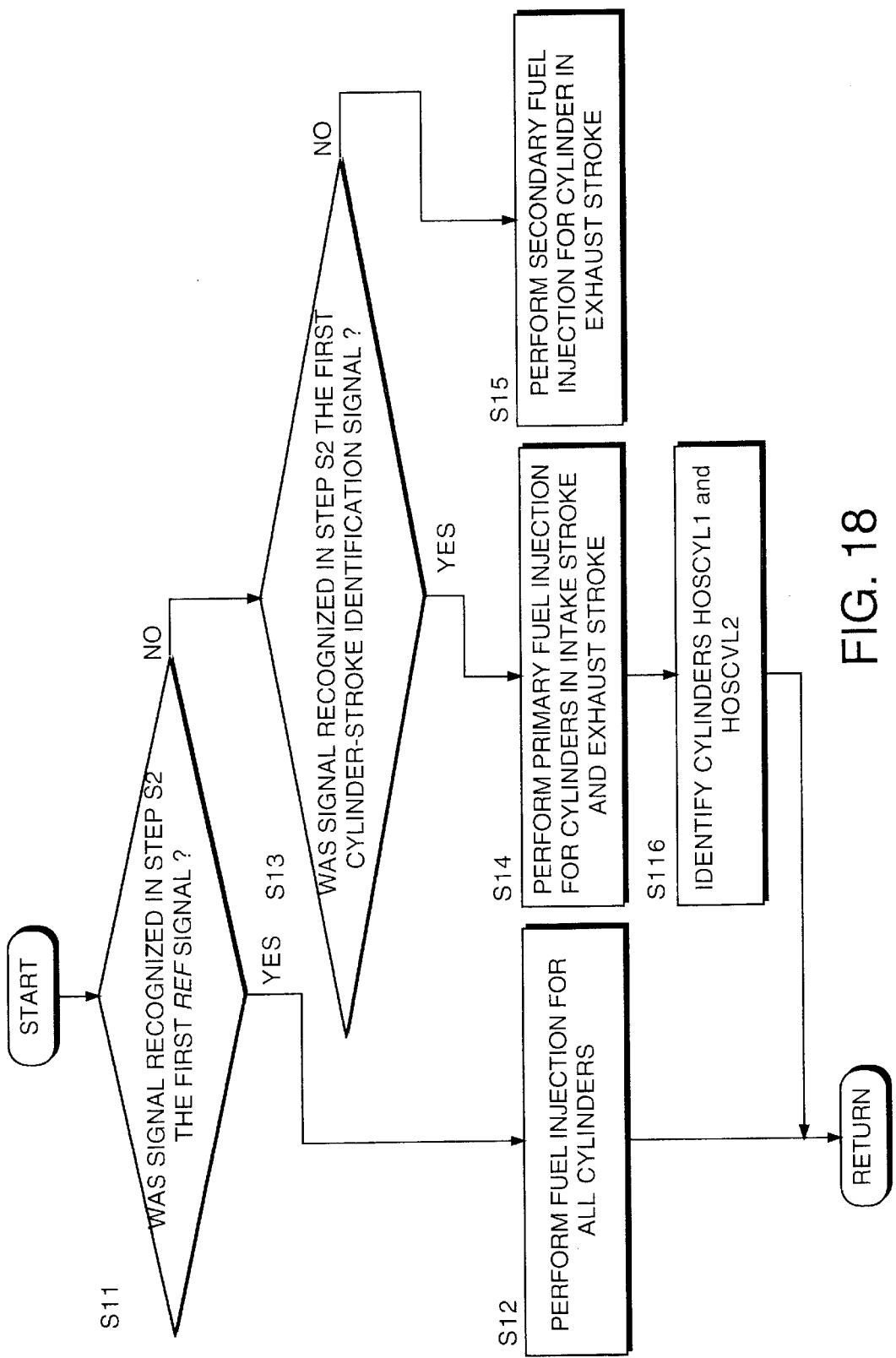
FIG. 18 is similar to FIG. 5 but showing a second embodiment of this invention.
Figure 19:
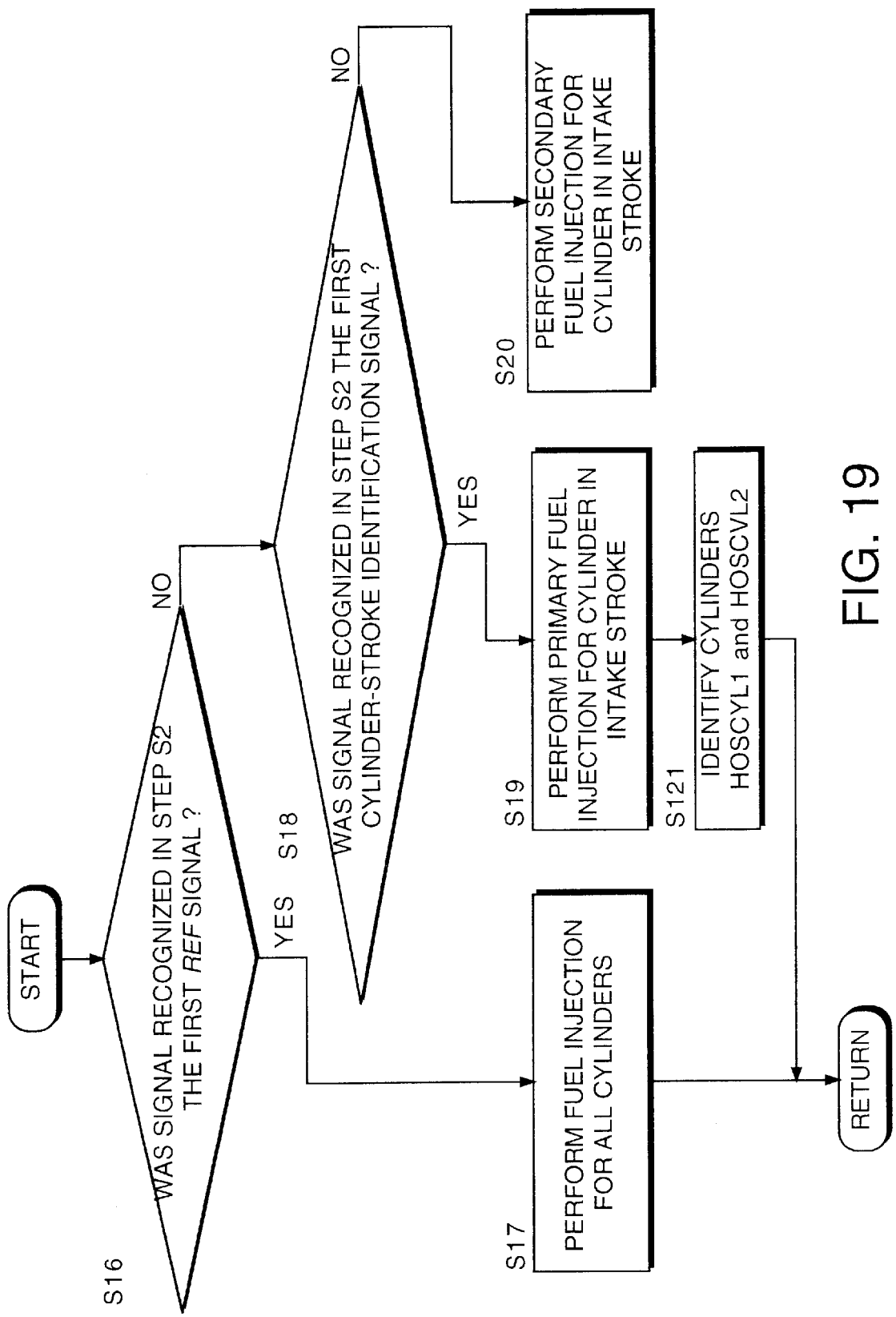
FIG. 19 is similar to FIG. 6 but showing the second embodiment of this invention.
Figure 20:
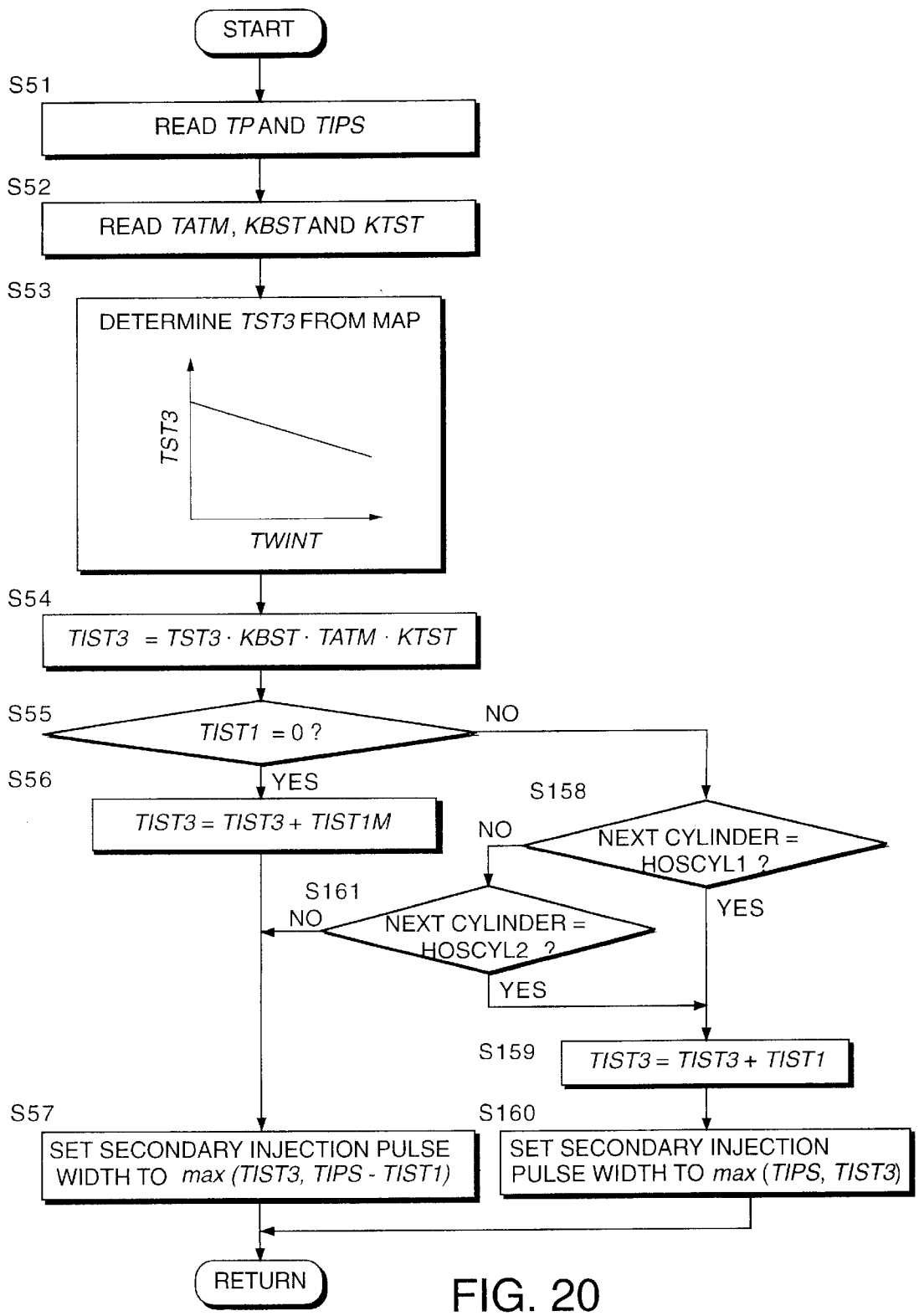
FIG. 20 is similar to FIG. 13 but showing the second embodiment of this invention.

Referring now to FIGS. 18–20, the above control by the controller 1 will be described. In this embodiment also, the controller performs the main routine of FIG. 3 and the subroutines of FIGS. 4, 7–12 and 14 as in the case of the first embodiment. The description of these routine and subroutines are omitted.

According to this embodiment, the controller 31 performs a subroutine shown in FIG. 18 in the step S8 of FIG. 4 instead of the subroutine of FIG. 5 of the first embodiment, for the fuel injection control in the preliminary and starting periods in the normal and low temperature range. The controller 31 performs a subroutine shown in FIG. 19 in the step S9 instead of the subroutine of FIG. 6 of the first embodiment, for the fuel injection control in the extremely low temperature range. The controller 1 performs a subroutine shown in FIG. 20 in the step S33 of FIG. 10 instead of the subroutine of FIG. 13 of the first embodiment, for calculating the fuel injection pulse width of the secondary fuel injection in the starting period.

The subroutine of FIG. 18 for controlling fuel injection in the preliminary period and starting period in the normal and low temperature range differs from that of FIG. 5 only in that a step S116 is provided after the step S14 for performing the primary fuel injection in the starting period. In the step S116, the controller 1 identifies cylinders HOSCYL1 and HOSCVL2 that were in the intake stroke when the preliminary fuel injection took place. The process of the other steps S11–S15 is identical to that of the subroutine of FIG. 5.

The subroutine of FIG. 19 for controlling fuel injection in the extremely low temperature range differs from that of FIG. 6 only in that a step S121 is provided after the step S19 for performing the primary fuel injection in the starting period. In the step S121, the controller 1 identifies the cylinders HOSCYL1 and HOSCVL2 as in the case of the step S116 of FIG. 18.

Herein, the relation of the first cylinder-stroke identification signal, the cylinders for which the primary fuel injection is performed in the extremely low temperature range, the cylinders for which the primary fuel injection is performed in the normal/low temperature range, and the above defined cylinders HOSCYL1 and HOSCYL2 are summarized in the following TABLE 1.

The cylinders HOSCYL1 and HOSCYL2 can be identified not only in an eight-cylinder engine but also in any type of engine, as long as the number of the cylinders and the interval/order of spark ignition are known. If this relation is previously stored in the memory of the controller 1, the controller 1 can immediately identify the cylinders HOSCYL1 and HOSCYL2 upon receiving the first cylinder-stroke identification signal.

Next the subroutine of FIG. 20 for calculating the fuel injection pulse width of the secondary fuel injection in the starting period will be described.

In addition to the steps S51–S57 which are identical to those of the subroutine of FIG. 13, this subroutine is further provided with steps S158–S160.

When the preliminary fuel injection pulse width TIST1 is not zero in the step S55, the controller 1 determines if the fuel injection on the next occasion is for the cylinder HOSCYL1 in a step S158. If the determination result of the step S158 is negative, the controller 1 determines if the fuel injection on the next occasion is for the cylinder HOSCYL2 in a step S161.

If the determination result in the step S161 is negative, the controller 1 sets the secondary fuel injection pulse width in the step S57 as in the case of the subroutine of FIG. 13.

If on the other hand, any of the determination results in the step S158 and S161 is affirmative, the controller 1 applies an increase correction of the secondary fuel injection pulse width TIST3 by adding the preliminary fuel injection pulse width TIST1 to the value calculated in the step S54, and set the resultant value as the secondary fuel injection pulse width TIST3.

In a next step S160, the controller 1 selects the larger of the target fuel injection pulse width TIPS that was read in the step S51 and the secondary fuel injection pulse width TIST3 corrected in the step S159 as the secondary fuel injection pulse width to be commanded to the fuel injector 15.

Due to the above process, when the secondary fuel injection for the cylinders #4 and #2 is performed, a larger amount of fuel is injected compared with the secondary fuel injection for the other cylinders, so the air-fuel ratio of the air-fuel mixture in these cylinders is prevented from becoming lean when they perform the first combustion.

Next, referring to FIGS. 21–25 and FIGS. 26A–26O, a third embodiment of this invention will be described.

This embodiment differs from the second embodiment in that the secondary fuel injection pulse width for the cylinder HOSCYL1 and that for the cylinder HOSCYL2 are set to have different values. The rate of fuel amount discharged from the exhaust valve 19 with respect to the preliminary fuel injection amount depends on the timing of the preliminary fuel injection. The rate decreases as the timing of the preliminary fuel injection becomes later in the intake stroke.

In this embodiment, therefore, different correction values are applied in the calculation of the secondary fuel injection amount for the cylinder HOSCYL1 and in the calculation of the secondary fuel injection amount for the cylinder HOSCYL2. The other part of the control is identical to that of the second embodiment.

Figure 21:
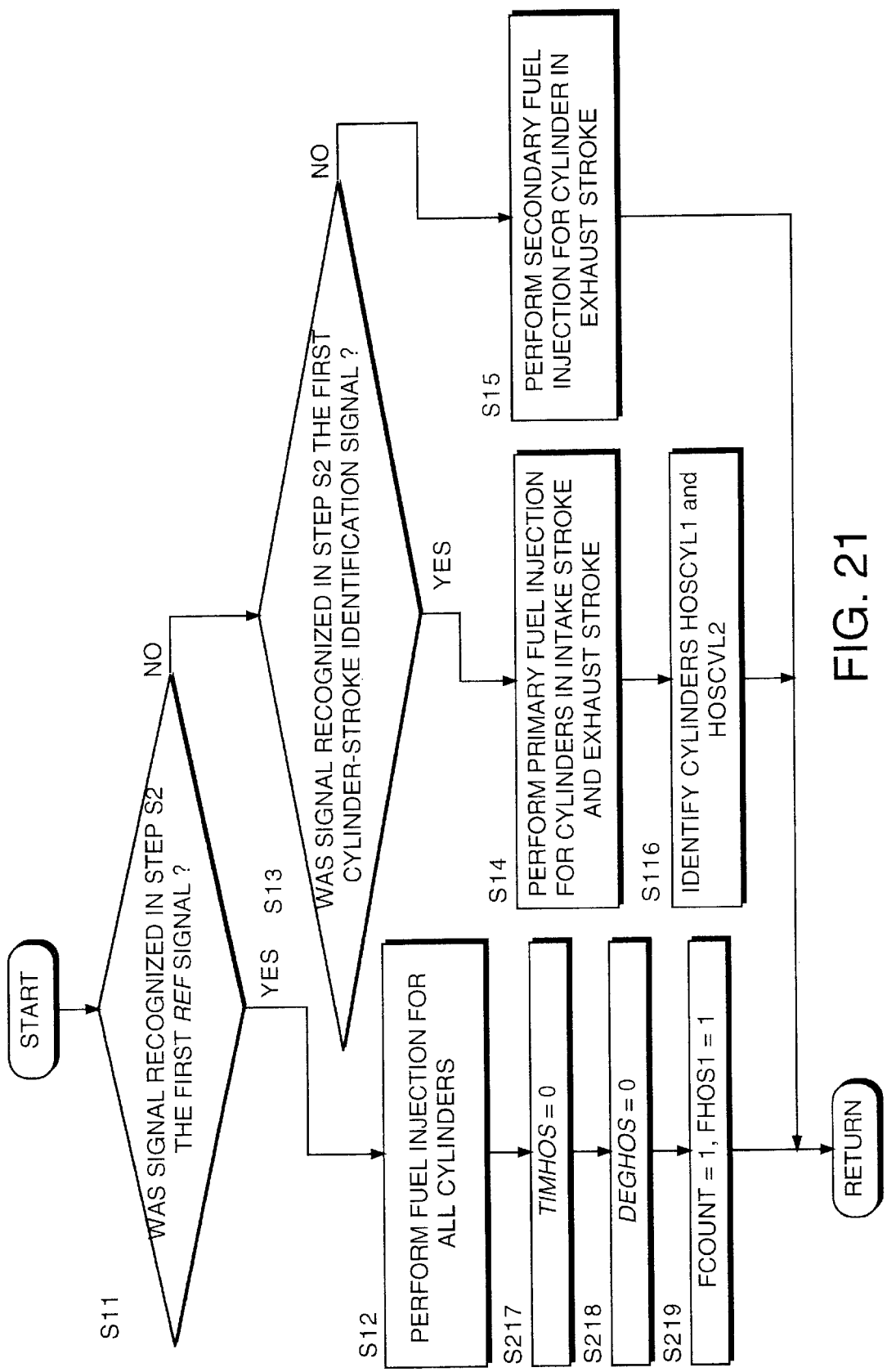
FIG. 21 is similar to FIG. 18 but showing a third embodiment of this invention.

FIG. 21 shows a subroutine that replaces the subroutine of FIG. 18 of the second embodiment for controlling fuel injection in the preliminary and starting periods in the normal and low temperature range.

In this subroutine, steps S217–S219 are added after the step S12 of FIG. 18.

The controller 1, after performing the preliminary fuel injection for all the cylinders in the step S12, resets a counter value TIMHOS to zero in the step S217. The counter value TIMHOS is a value for measuring an elapsed time from when the preliminary fuel injection was started.

In the next step S218, the controller resets a crank angle counter value DEGHOS to zero. The crank angle counter value DEGHOS is a value for measuring a current crank angle relative to the crank angle when the preliminary fuel injection was started.

In the next step S219, the controller sets a count flag FCOUNT and a determination flag FHOS1 to unity. The count flag FCOUNT shows whether or not the counting of the elapsed time is being carried, and the determination flag FHOS1 shows whether or not the crank angle counter value DEGHOS has reached a predetermined angle.

As mentioned hereinabove, even in the cylinder where the preliminary fuel injection is performed in the intake stroke, the injected fuel is not aspirated into the combustion chamber 6 if the injection is performed immediately before the closing of the intake valve 18. The predetermined angle is a threshold value to determine if the injected fuel is aspirated into the combustion chamber 6.

In the cylinder where the preliminary fuel injection is performed in the intake stroke, fuel injected during a period when the determination flag FHOS1 is zero is considered to be aspirated into the combustion chamber 6, but fuel injected after the determination flag FHOS1 has changed to unity is considered not to be aspirated into the combustion chamber 6. The initial values of the count flag FCOUNT and the determination flag FHOS1 are both zero.

Figure 22:
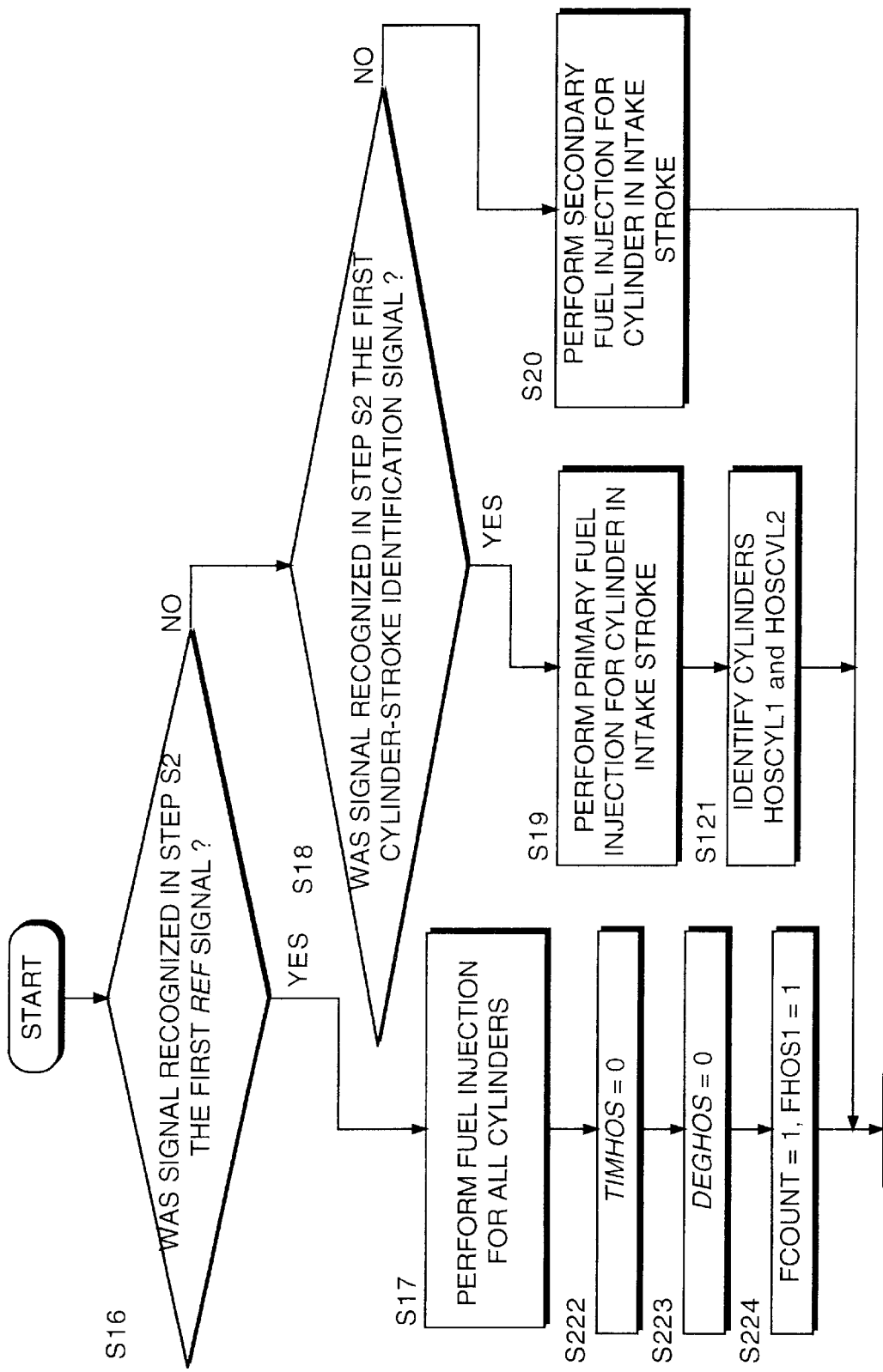
FIG. 22 is similar to FIG. 19 but showing the third embodiment of this invention.

FIG. 22 shows a subroutine that replaces the subroutine of FIG. 19 of the second embodiment for controlling fuel injection in the extremely low temperature range.

In this subroutine, steps S222–S224 are added after the step S17 of the subroutine of FIG. 19. The process of the steps S222–S224 is identical to that of the step S217–S219 in FIG. 21.

Figure 23:
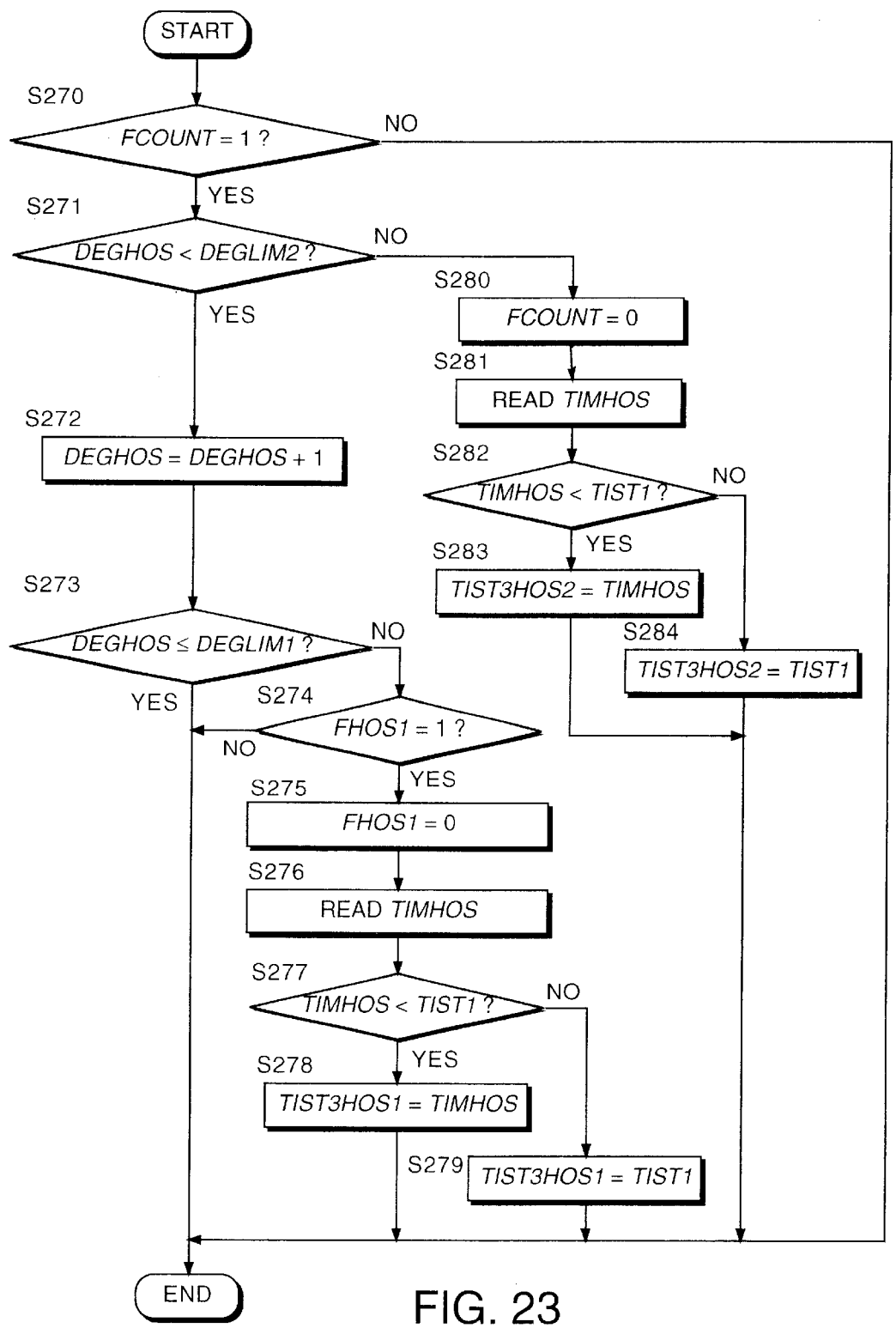
FIG. 23 is a flowchart describing a routine performed by a controller according to the third embodiment of this invention for calculating a fuel amount discharged from an exhaust valve of the engine.

FIG. 23 shows a routine for calculating a fuel amount in pulse width which is discharged from the exhaust valve 19 of the cylinder which had preliminary fuel injection in the intake stroke. The pulse width calculated by this routine constitutes a secondary fuel injection correction value TIST3HOST. The controller 1 repeats this routine at an interval of one degree in crank angle based on the POS signal from the crank angle sensor 9.

In a first step S270, the controller 1 determines if the count flag FCOUNT is not unity. When the count flag FCOUNT is not unity, it means that the measurement of the elapsed time is not being performed, and the controller 1 immediately terminates the routine without proceeding to further steps.

When on the other hand, the count flag FCOUNT is unity, the controller 1 determines if the crank angle counter value DEGHOS has reached a predetermined angle DEGLIM2 in a step S271.

When the crank angle counter value DEGHOS has not reached the predetermined angle DEGLIM2, the controller 1 increments the crank angle counter value DEGHOS in a next step S272.

In a next step S273, the controller 1 compares the crank angle counter value DEGHOS with a predetermined angle DEGLIM1. In an eight-cylinder engine, DEGLIM1 is equal to DEGLIM2 minus ninety degrees.

When the crank angle counter value DEGHOS has not reached the predetermined angle DEGLIM1, the controller 1 terminates the routine without proceeding to further steps.

The intake stroke of the cylinder HOSCYL1 is ninety degrees advanced from that of the cylinder HOSCYL2.

The fuel injected by the preliminary fuel injection for the cylinder HOSCYL2 before the crank angle counter value DEGHOS reaches the predetermined angle DEGLIM2 is aspirated into the combustion chamber 6 of the cylinder HOSCYL2 in the intake stroke, and discharged from the exhaust valve 19 in the exhaust stroke.

The fuel injected by the preliminary fuel injection for the cylinder HOSCYL2 after the crank angle counter value DEGHOS has reached the predetermined angle DEGLIM2 is not aspirated into the combustion chamber 6 of the cylinder HOSCYL2 in the intake stroke. This fuel is aspirated into the combustion chamber 6 on the next occasion when the cylinder HOSCYL2 performs the intake stroke and used for the first combustion in the cylinder HOSCYL2.

Similarly, the fuel injected by the preliminary fuel injection for the cylinder HOSCYL1 before the crank angle counter value DEGHOS reaches the predetermined angle DEGLIM1 is aspirated into the combustion chamber 6 of the cylinder HOSCYL1 and discharged from the exhaust valve 19 when this cylinder performs the exhaust stroke. The fuel injected by the preliminary fuel injection for the cylinder HOSCYL1 after the crank angle counter value DEGHOS has reached the predetermined angle DEGLIM1 is used for the first combustion in the cylinder HOSCYL1.

All the fuel injected for the cylinder HOSCYL1 before the crank angle counter value DEGHOS reaches the predetermined angle DEGLIM1 and all the fuel injected for the cylinder HOSCYL2 before the crank angle counter value DEGHOS reaches the predetermined angle DEGLIM2 are discharged from the exhaust valve 19 and not used for the first combustion in these cylinders. In this case, therefore, the controller 1 terminates the routine without performing further steps.

When the crank angle counter value DEGHOS has reached the predetermined angle DEGLIM1 in the step S273, the controller 1 performs the process of steps S274–S279.

First, in the step S274, the controller 1 determines if the determination flag FHOS1 is unity. When the determination flag FHOS1 is not unity, the controller 1 terminates the routine without proceeding to further steps.

The determination flag FHOS1 as well as the count flag FCOUNT are set to unity in the step S219 of FIG. 21 or the step S224 of FIG. 22. Accordingly, when the count flag FCOUNT is determined to have a value of unity in the step S270, the determination flag FHOS1 also has a value of unity.

When the crank angle counter value DEGHOS exceeds the predetermined crank angle DEGLIM1 in this state, the controller 1 resets the determination flag FHOS1 to zero in the step S275. In the next and subsequent occasion when this routine is performed, the process of the steps S275–S279 is not performed, because the determination flag FHOS1 is zero. In other words, the process of the steps S275–S279 is performed only once immediately after the crank angle counter value DEGHOS has exceeded the predetermined angle DEGLIM1.

After resetting determination flag FHOS1 to zero in the step S275, the controller 1 reads the counter value TIMHOS in the step S276 and compares it with the preliminary fuel injection pulse width TIST1. When the counter value TIMHOS is smaller than the preliminary fuel injection pulse width TIST1, it means that the preliminary fuel injection is still being performed when the crank angle counter DEGHOS has exceeded the predetermined angle DEGLIM. In this case, fuel amount equivalent to the counter value TIMHOS out of the preliminary fuel injection amount TIST1 is discharged from the exhaust valve 19. So the controller 1 sets a secondary fuel injection pulse width correction value TIST3HOS1 for the cylinder HOSCYL1 to be equal to the counter value TIMHOS in the step S278.

When on the other hand the counter value TIMHOS is not smaller than the preliminary fuel injection pulse width TIST1, it means that the preliminary fuel injection has been completed before the crank angle counter DEGHOS exceeds the predetermined value DEGLIM1. In this case, all the fuel injected by the preliminary fuel injection will be discharged from the exhaust valve 19. So the controller 1 sets the secondary fuel injection pulse width correction value TIST3HOS1 for the cylinder HOSCYL1 to be equal to the preliminary fuel injection pulse width TIST1 in the step S279.

After the process of the step S278 or S279, the controller 1 terminates the routine.

When the crank angle counter DEGTHOS has reached the predetermined crank angle DEGLIM2 in the step S271, the controller 1 performs the process of steps S280–S284.

First, in the step S280, the controller 1 resets the counter flag FCOUNT to zero such that the routine would not substantially be performed thereafter. After the process of the step S280, the controller determines a secondary fuel injection pulse width correction value TIST3HOS2 for the cylinder HOSCYL2 by performing a process of the steps S281–S283 in the same manner as that of the step S277–S279. After the process of the steps S281–S283, the controller 1 terminates the routine.

Figures 24, 25:
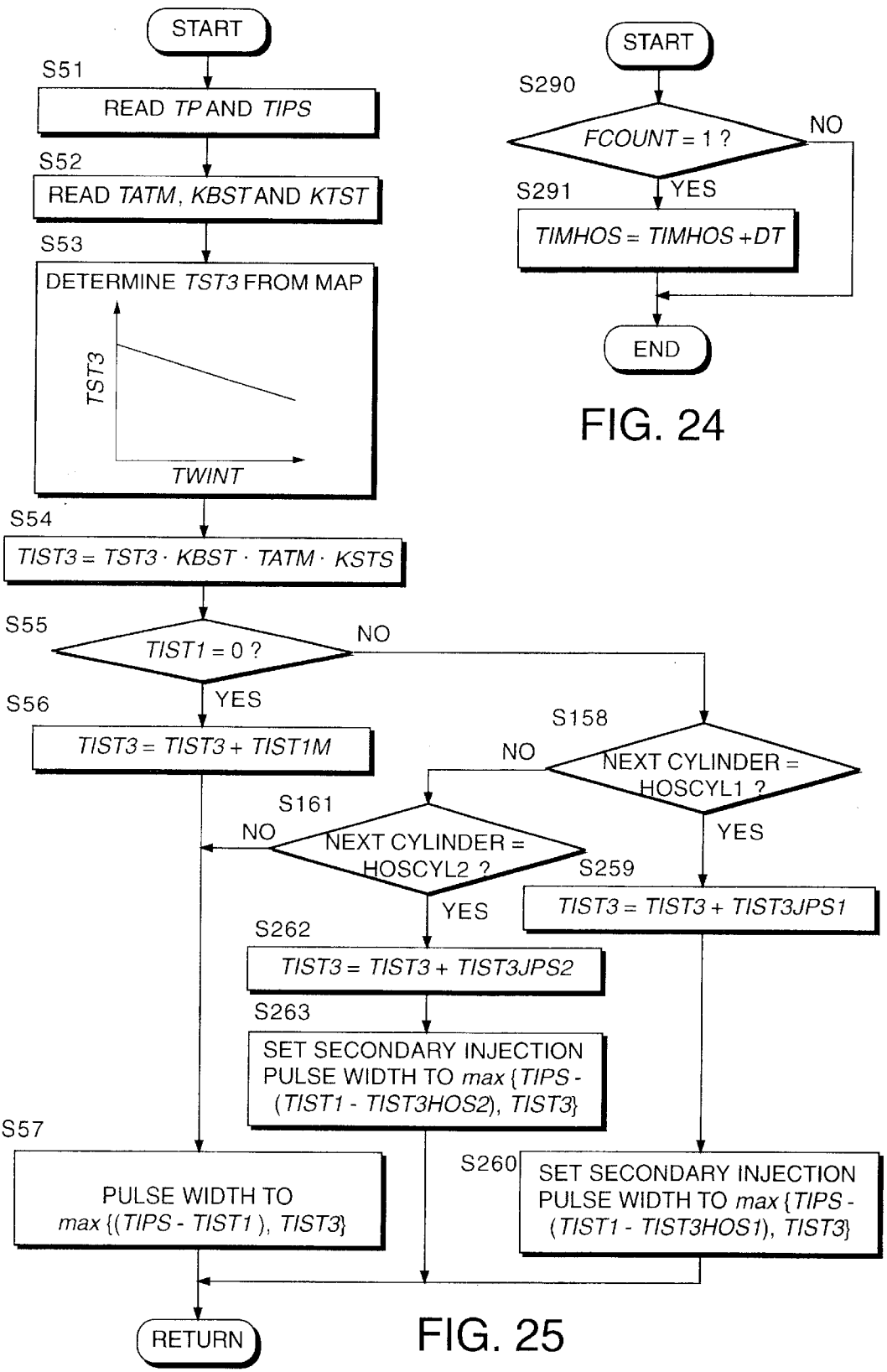
FIG. 24 is a flowchart describing a routine performed by the controller according to the third embodiment of this invention for counting an elapsed time from a start of the preliminary fuel injection.
FIG. 25 is similar to FIG. 20 but showing the third embodiment of this invention.

FIG. 24 shows a counting routine of the counter value TIMHOS. The controller performs this routine at a regular interval DT. The regular interval DT is herein set to ten milliseconds.

In a first step S290, the controller determines if the count flag FCOUNT has a value of unity. When the counter flag FCOUNT is not unity, it means that the calculation of the secondary fuel injection pulse width correction values TIST3HOS1 and TIST3HOS2 is not being performed. So, the controller 1 terminates the routine without proceeding to a next step S291.

When the counter value FCOUNT has a value of unity, the controller 1 increases the counter value TIMHOS by the increment of DT. After the process of the step S291, the controller 1 terminates the routine.

FIG. 25 shows a subroutine which the controller 1 performs instead of the subroutine of FIG. 20 of the second embodiment for the calculation of the secondary fuel injection pulse width in the starting period.

The steps S51–S57 and the steps S158 and S261 in this subroutine are identical to those of the FIG. 20. In this subroutine, steps S259, S260, S262 and S263 are newly provided instead of the steps S159 and S160 of FIG. 20.

When it is determined that the secondary fuel injection on the next occasion will be performed for the cylinder HOSCYL1, the controller 1 performs an increase correction of the secondary fuel injection pulse width TIST3 for the cylinder HOSCYL1 by the secondary fuel injection pulse width correction value TIST3HOS1 that was calculated by the routine of FIG. 23.

In a next step S260, the larger of the value {TPS−(TIST1−TIST3HOS1} and the secondary fuel injection pulse width TIST3 corrected in the step S259 is set as the secondary fuel injection pulse width for the cylinder HOSCYL1. Herein TIPS is the fuel injection pulse width that was read in the step S51 and TIST1 is the preliminary fuel injection pulse width set in the subroutine of FIG. 11. After the process of the step S260, the controller 1 terminates the subroutine.

When it is determined that the secondary fuel injection on the next occasion will be performed for the cylinder HOSCYL2 in the step S161, the controller 1 performs an increase correction of the secondary fuel injection pulse width TIST3 for the cylinder HOSCYL2 by the secondary fuel injection pulse width correction value TIST3HOS2 that was calculated by the routine of FIG. 23.

In a next step S263, the larger of the value {TIPS−(TIST1−TIST3HOS2} and the secondary fuel injection pulse width TIST3 corrected in the step S262 is set as the secondary fuel injection pulse width for the cylinder HOSCYL2. After the process of the step S263, the controller 1 terminates the subroutine.

According to this embodiment, with respect to the cylinders HOSCYL1 and HOSCYL2 which undergo the preliminary fuel injection in the intake stroke, the amount of fuel that would be discharged from the exhaust valve 19 is calculated based on the crank angle counter value DEGHOS which represents the crank angle from the start of the preliminary fuel injection. The controller 1 sets the secondary fuel injection pulse width correction values TIST3HOS1 and TIST3HOS2 to be equivalent to the fuel amount that would be discharged from the exhaust valve 19 of the cylinders HOSCYL1 and HOSCYL2 respectively. These correction values are then added to the secondary fuel injection pulse width TIST3.

Referring now to FIGS. 26fA–26O, providing that the cylinder-stroke identification signal detects a specific position in the later period of the compression stroke of each cylinder, and the first cylinder-stroke identification signal corresponds to the specific position of the cylinder #5, the preliminary fuel injection is performed for the cylinders #4 and #2 when they are in the intake stroke.

Although the timing charts of FIGS. 26fA–26O describe the situation in the low temperature range, the same correction is applied in the extremely low temperature range with respect to the calculation of the secondary fuel injection amount for the cylinder HOSCYL1 and that for the cylinder HOSCYL2. The timing charts for the extremely low temperature range is therefore omitted herein.

The fuel injected in the state where the intake valve 18 is open is immediately aspirated into the combustion chamber 6 and discharged when the cylinder performs the exhaust stroke.

It should be noted that in the cylinders #4 and #2, the spark plug 14 sparks in the compression stroke before the cylinders perform the exhaust stroke, but since there is not enough fuel in these cylinders to form a combustible air-fuel mixture, the fuel aspirated into these cylinders are not burned and discharged from the exhaust valve 19 in the exhaust stroke that follows.

The controller 1 calculates the secondary fuel injection pulse width correction values TIST3HOS1 and TIST3HOS2 for compensating the discharged amount of fuel from these cylinders #4 and #2, and increases the secondary fuel injection amount for the cylinders #4 and #2 by these correction values respectively.

Due to the above process, the air-fuel ratio of the air-fuel mixture that is burned by the first combustion is maintained at a preferable level even in a cylinder where the whole or a part of the fuel injected by the preliminary fuel injection is discharged before the first combustion takes place.

Next, referring to FIG. 27, a fourth embodiment of this invention will be described.

According to this embodiment, in addition to the control process of the third embodiment, a wall flow correction of the secondary fuel injection pulse width TIST3 for the cylinders HOSCYL1 and HOSCYL2 in the starting period is further performed.

In the third embodiment, it is considered that whole of the fuel injected for the cylinder HOSCYL1 before the crank angle counter value DEGHOS reaches the predetermined angle DEGLIM1 and whole of the fuel injected for the cylinder HOSCYL2 before the crank angle counter value DEGHOS reaches the predetermined angle DEGLIM2 are discharged before the first combustion takes place. In reality, however, a part of the fuel injected in this period will remain in the intake port 7 in the form of a wall flow and be burned when the cylinder performs the first combustion. The rate of the generation of wall flow with respect to the total preliminary fuel injection amount depends on the temperature of the engine.

Figure 27:
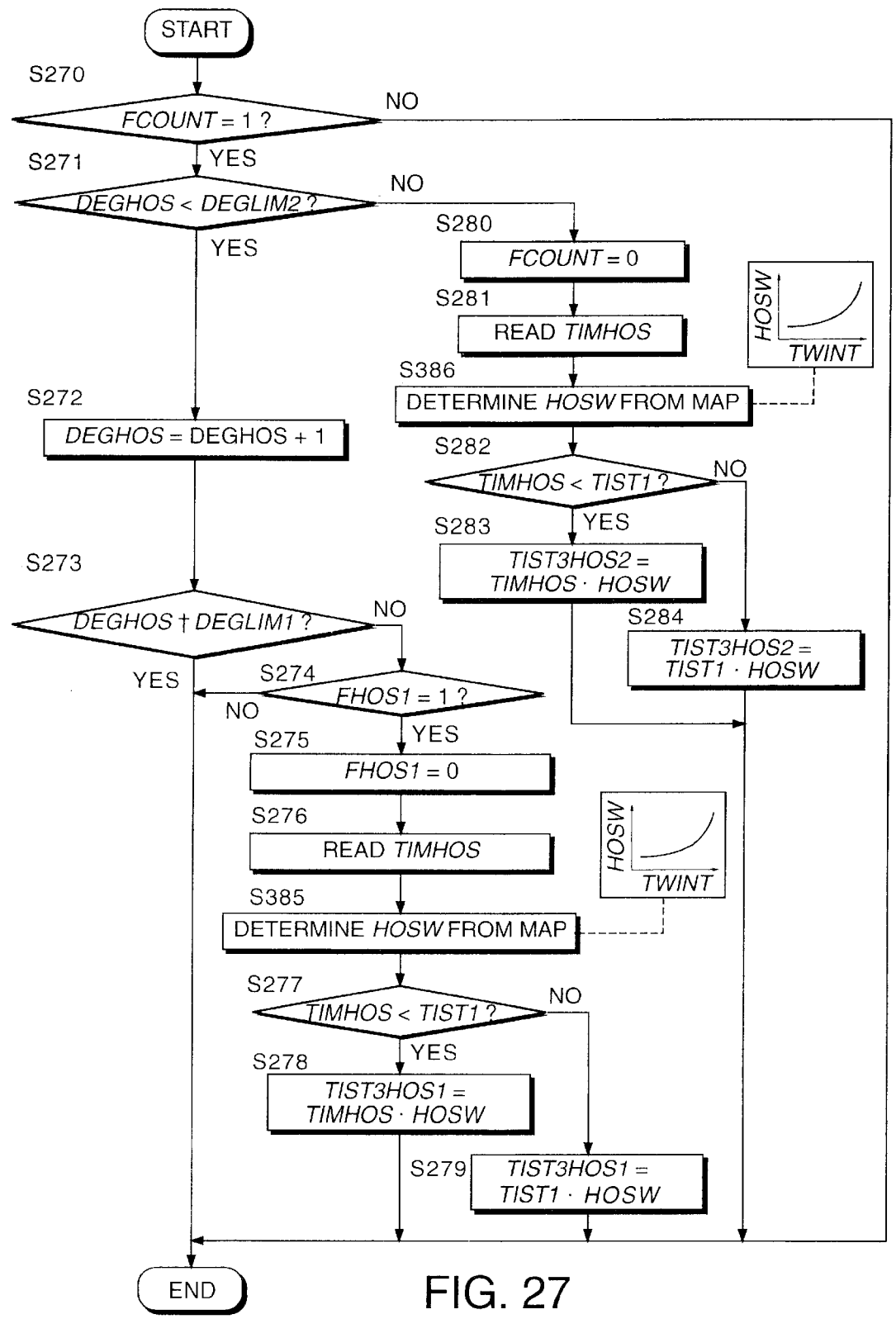
FIG. 27 is similar to FIG. 23 but showing a fourth embodiment of this invention.

In this embodiment, the controller 1 determines a wall flow correction coefficient HOSW according to the water temperature TWINT at the startup of cranking, and corrects the secondary fuel injection pulse width correction values TIST3HOS1 and TIST3HOS2 using the wall flow correction coefficient HOSW In order to realize the above control, the controller 1 performs a subroutine shown in FIG. 27 instead of the subroutine of FIG. 23 of the third embodiment for calculating the fuel amount which is discharged from the exhaust valve 19.

Describing this subroutine in comparison with the subroutine of FIG. 23, a step S385 is provided between the steps S276 and S277, a step S378 is provided for replacing the step S278, and a step S379 is provided for replacing the step S279. Similarly, a step S386 is provided between the steps S281 and S282, a step S383 is provided for replacing the step S283 and a step S284 is provided for replacing the step S284.

The process of the step S385 and that of the step S386 are identical. Specifically, the wall flow correction coefficient HOSW is looked up in a map of which the characteristics are shown in the figure from the water temperature TWINT. The map is previously stored in the memory of the controller 1.

In the step S378, the controller 1 sets a value obtained by multiplying the counter value TIMHOS by the wall flow correction coefficient HOSW is set as the secondary fuel injection pulse width correction value TIST3HOS1 for the cylinder HOSCYL1. In the step S379, a value obtained by multiplying the preliminary fuel injection pulse width TIST1 by the wall flow correction coefficient HOSW is set as the secondary fuel injection pulse width correction value TIST3HOS1 for the cylinder HOSCYL1.

Likewise, in the step S383, a value obtained by multiplying the counter value TIMHOS by the wall flow correction coefficient HOSW is set as the secondary fuel injection pulse width correction value TIST3HOS2 for the cylinder HOSCYL2. In the step S384, a value obtained by multiplying the preliminary fuel injection pulse width TIST1 by the wall flow correction coefficient HOSW is set as the secondary fuel injection pulse width correction value TIST3HOS2 for the cylinder HOSCYL2.

According to this embodiment, the air-fuel ratio of the air-fuel mixture that is burned by the first combustion in the cylinders HOSCYL1 and HOSCYL2 can be controlled more precisely.

Next, referring to FIGS. 28A–28C and FIGS. 29–31, a fifth embodiment of this invention will be described.

Figure 28A:
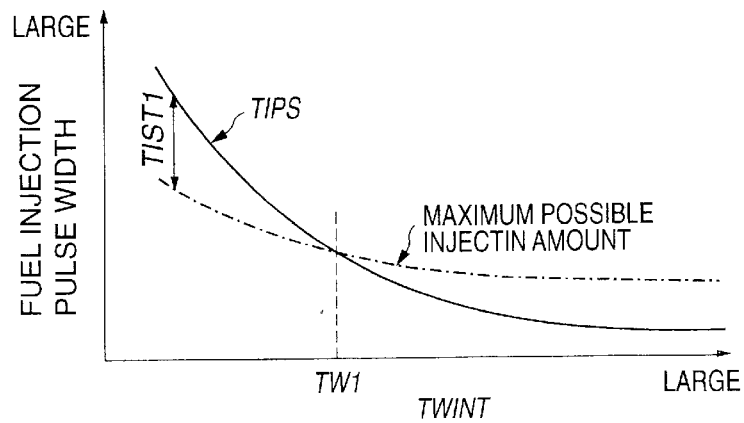
FIGS. 28A–28C are diagrams describing a setting method of the fuel injection amount applied by a controller according to a fifth embodiment of this invention.
Figure 28B:
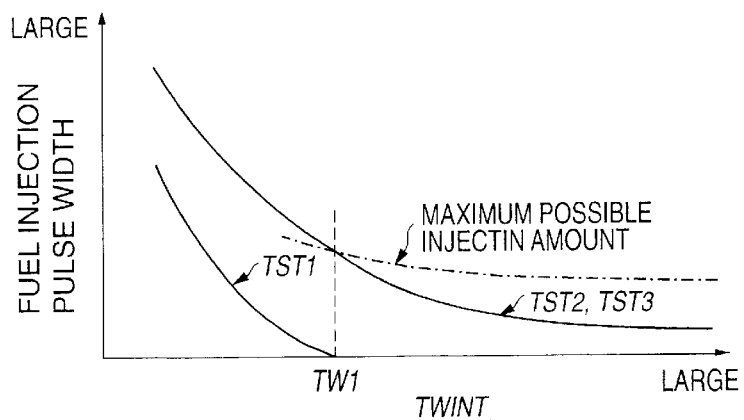
Figure 28C:
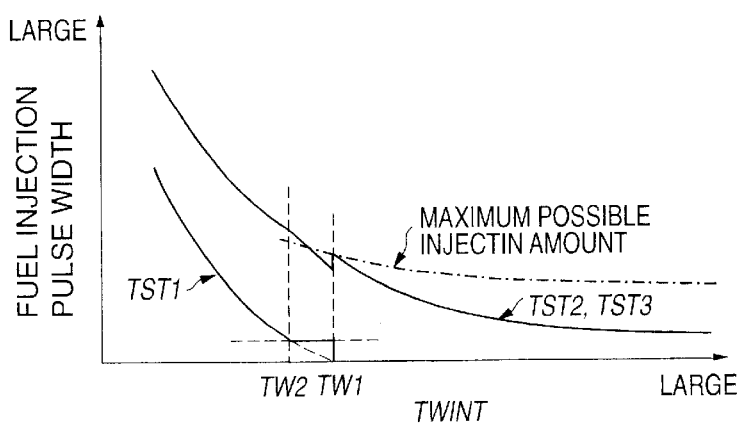

Referring to FIGS. 28A–28C, when the water temperature TWINT of the engine at startup of cranking is low, the required fuel injection pulse width TIPS is large because injected fuel is not quickly atomized. On the other hand, when the water temperature of the engine is low, frictional resistance of the engine is also large, so the cranking rotation speed is lowered. As a result, the maximum fuel injection amount that the fuel injector 8 can inject in one injection increases. However, since the former phenomenon affects largely to the fuel injection control than the latter, the required fuel injection pulse width exceeds the maximum possible injection pulse width of the fuel injector 8, when the water temperature TWINT at startup of cranking is lower than a threshold temperature Tw1. As described hereinabove, the preliminary fuel injection has a meaning of previously compensating this deficiency in fuel injection pulse width.

When the water temperature TWINT at startup of cranking is high, the required fuel injection pulse width is smaller than the maximum possible injection pulse width of the fuel injector 8. When the water temperature TWINT at startup of cranking is higher than the predetermined temperature Tw1, the basic value TIST1 for the preliminary fuel injection pulse width will be zero as shown in FIG. 28B. Accordingly, the preliminary fuel injection pulse width TIST1 will be zero.

Referring to FIG. 28C, a predetermined temperature Tw2 corresponds to the temperature where the preliminary fuel injection pulse width TIST1 is equal to the minimum fuel injection pulse width TEMIN that the fuel injector 8 can inject.

When the water temperature at the cranking start TWINT is between the values Tw1 and Tw2, the preliminary fuel injection pulse width TIST1 is not zero but smaller than the minimum fuel injection pulse width TEMIN. In this case, according to the aforementioned first–fourth embodiments, the preliminary fuel injection is not performed, but the pulse width corresponding to the preliminary fuel injection pulse width TIST1 is stored in the memory of the controller 1 as a memorized pulse width TIST1M and it is added later to the fuel injection pulse widths TIST2 and TIST3 in the starting period.

Herein, the maximum value that can be added to the fuel injection pulse widths TIST2 and TIST3 is equal to the minimum fuel injection pulse width TEMIN. It is therefore necessary to ensure that the total pulse width of TIST2 or TIST3 and the minimum fuel injection pulse width TEMIN should not exceeds the maximum possible fuel injection pulse width of the fuel injector 8. A process performed by the controller 1 to ensure the above control would be somewhat complicated.

In this embodiment, as shown in FIG. 28C, the controller 1 is programmed to control the fuel injector 8 to perform the preliminary fuel injection with a fuel injection pulse width equal to the minimum fuel injection pulse width TEMIN, when the preliminary fuel injection pulse width TIST1 is smaller than the minimum fuel injection pulse width TEMIN of the fuel injector 8, and the difference between the minimum fuel injection pulse width and the preliminary fuel injection pulse width is subtracted from the pulse widths TIST2 and TIST3 in the starting period respectively.

Figure 29:
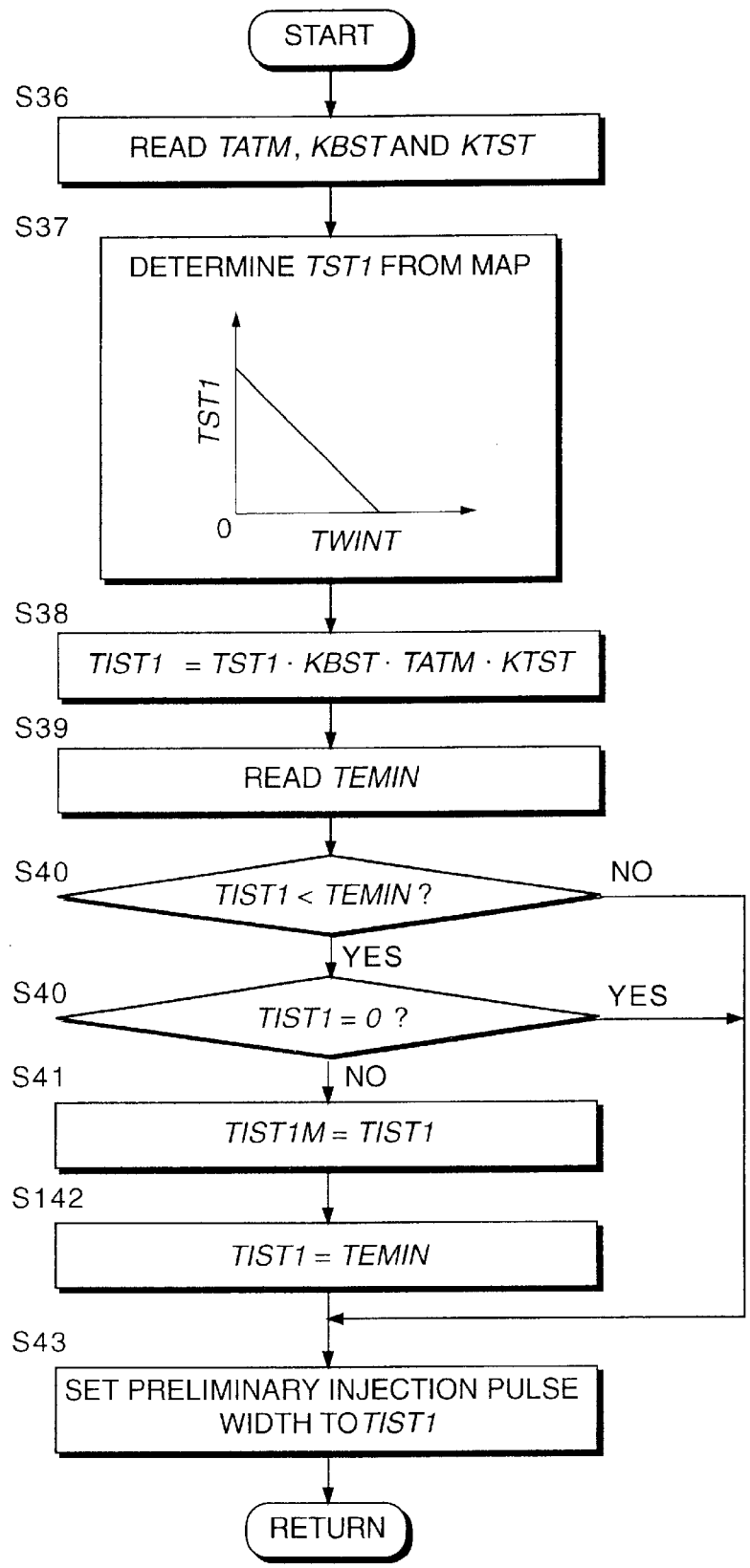
FIG. 29 is similar to FIG. 11 but showing the fifth embodiment of this invention.
Figure 30:
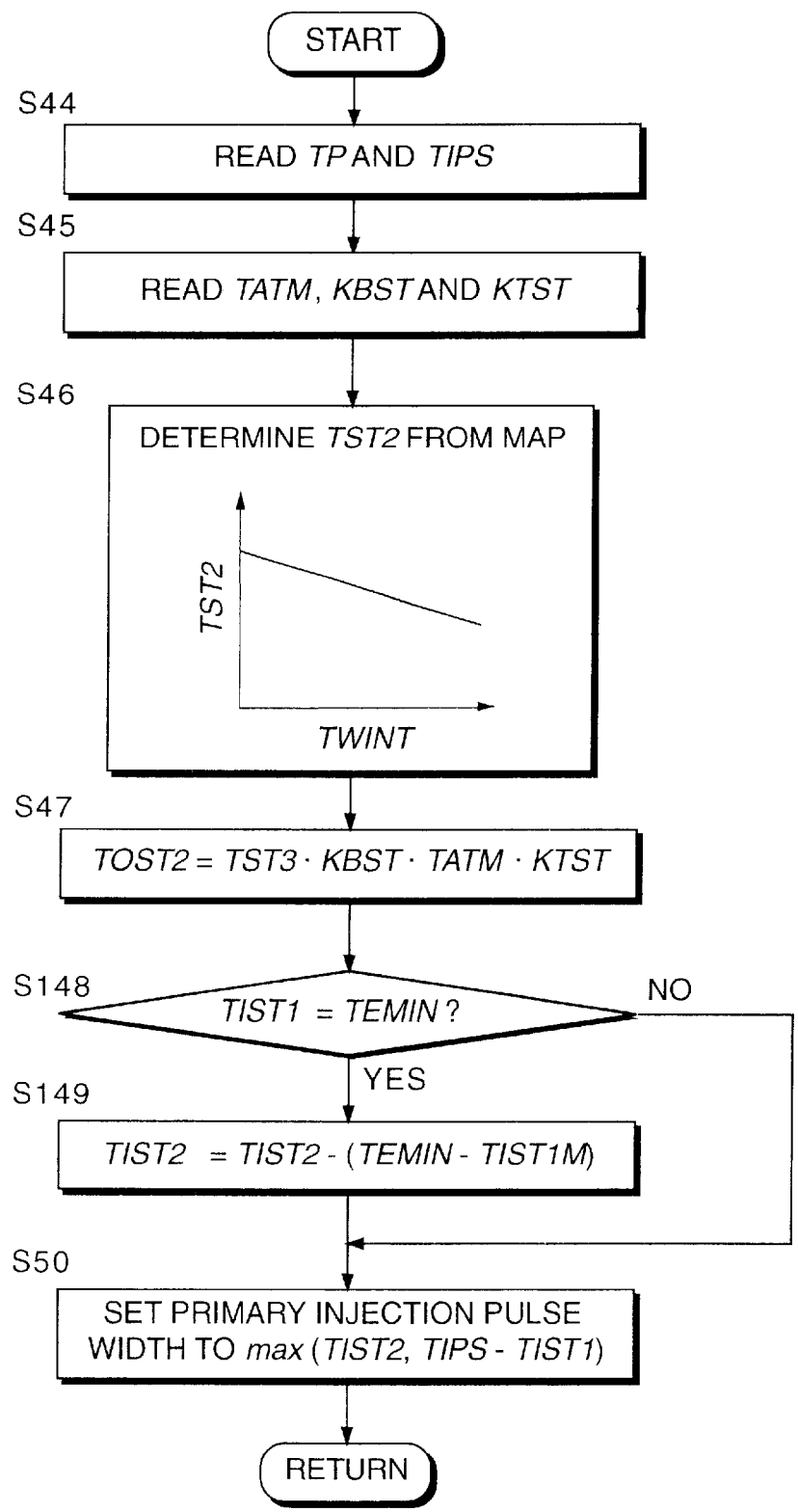
FIG. 30 is similar to FIG. 12 but showing the fifth embodiment of this invention.
Figure 31:
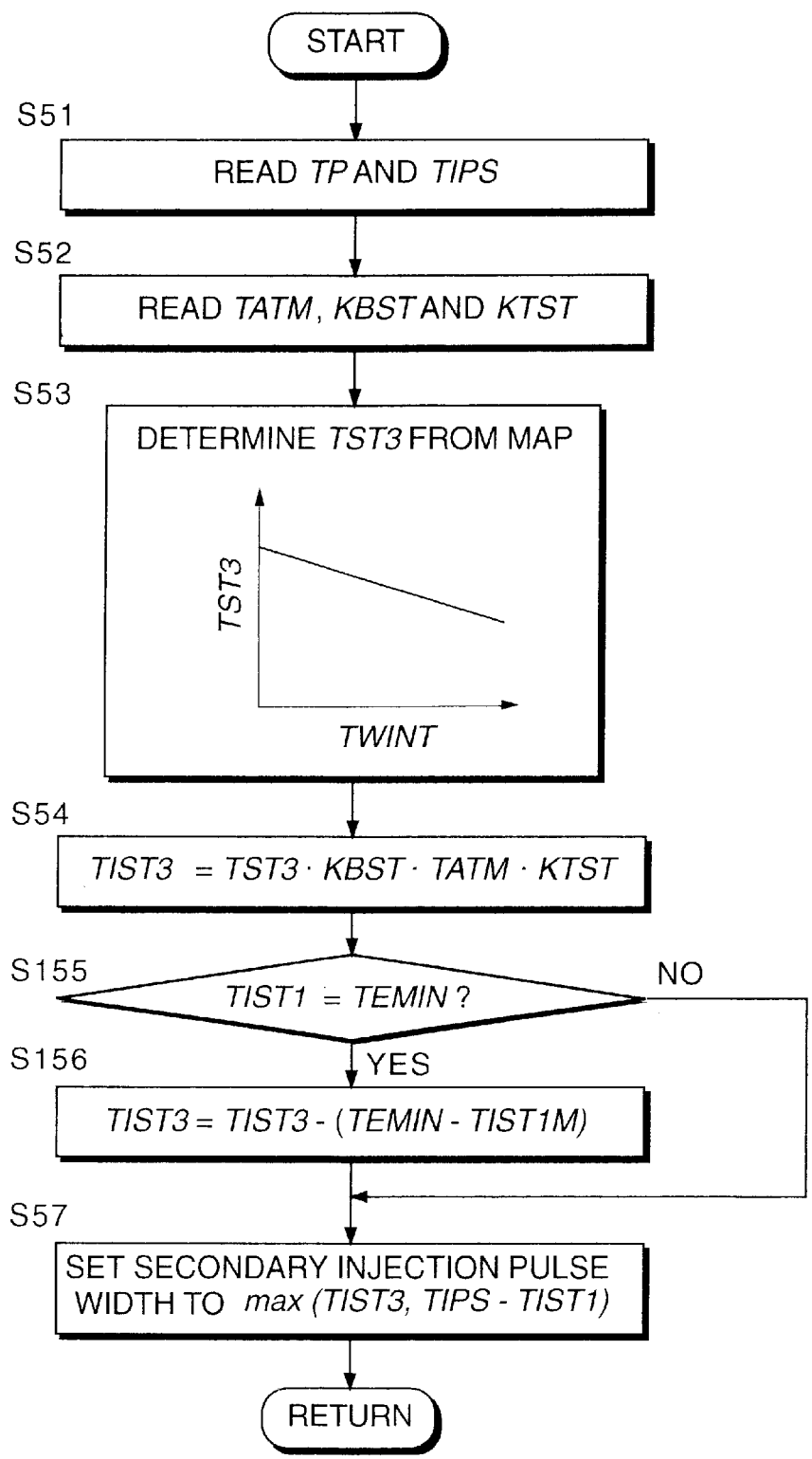
FIG. 31 is similar to FIG. 13 but showing the fifth embodiment of this invention.

Next, referring to FIGS. 29–31, the control process for the above control is described. The engine to which this embodiment is applied is a four-stroke cycle four-cylinder engine that is identical to the engine 1 to which the first embodiment is applied.

In this embodiment, the controller 1 performs a subroutine of FIG. 29 instead of the subroutine of FIG. 11, performs a subroutine of FIG. 30 instead of the subroutine of FIG. 12, and performs a subroutine of FIG. 31 instead of the subroutine of FIG. 13.

The subroutine of FIG. 29 corresponds to that of FIG. 11 wherein the step S42 is replaced by a step S142 and a step S144 is newly introduced.

Referring to FIG. 29, when the preliminary fuel injection pulse width TIST1 is smaller than the minimum fuel injection pulse width TEMIN in the step S40, the controller 1 determines if the preliminary fuel injection pulse width TIST1 has a value of zero in a step S144.

When the preliminary fuel injection pulse width TIST1 is not smaller than the minimum fuel injection pulse width TEMIN in the step S40, or when the preliminary fuel injection pulse width TIST1 has a value of zero in the step S144, the controller 1 proceeds to the last step S43.

When on the other hand the preliminary fuel injection pulse width TIST1 does not have a value of zero in the step S144, the controller 1 sets the stored value TIST1M to be equal to the preliminary fuel injection pulse width TIST1 as in the case of the first embodiment, but sets the preliminary fuel injection pulse width TIST1 equal to the minimum fuel injection pulse width TEMIN in a following step S142.

In the last step S43, the controller 1 sets the preliminary fuel injection pulse width that will actually be commanded to the fuel injector 8 equal to the value of TIST1 that has been set in the step S38 or step S142. After performing the process of the step S43, the controller 1 terminates the subroutine.

The subroutine of FIG. 30 corresponds to the subroutine of FIG. 12 wherein the step S48 is replaced by a step S148 and the step S49 is replaced by a step S149.

In the step S148, the controller 1 determines if the preliminary fuel injection pulse width TIST1 is equal to the minimum fuel injection pulse width TEMIN.

When the preliminary fuel injection pulse width TIST1 is not equal to the minimum fuel injection pulse width TEMIN in the step S148, the controller 1 performs the process of the last step S50 as in the case of the first embodiment.

When the preliminary fuel injection pulse width TIST1 is equal to the minimum fuel injection pulse width TEMIN in the step S148, the controller 1 sets a value obtained by subtracting a difference of the minimum fuel injection pulse width TEMIN and the stored value TIST1M from the preliminary fuel injection pulse width TIST2 as a new primary fuel injection pulse width TIST2 in the step S149. After the process of the step S149, the controller proceeds to the last step S50 where the primary fuel injection pulse width that will actually be commanded to the fuel injector 8 is set in a similar way as in the first embodiment, and terminates the subroutine.

The subroutine of FIG. 31 corresponds to subroutine of FIG. 13 wherein the step S55 is replaced by a step s155 and the step S56 is replaced by a step S156.

In the step S155, the controller 1 determines if the preliminary fuel injection pulse width TIST1 is equal to the minimum fuel injection pulse width TEMIN.

When the preliminary fuel injection pulse width TIST1 is not equal to the minimum fuel injection pulse width TEMIN in the step S155, the controller 1 performs the process of the last step S57 as in the case of the first embodiment.

When the preliminary fuel injection pulse width TIST1 is equal to the minimum fuel injection pulse width TEMIN in the step S155, the controller 1 sets a value obtained by subtracting a difference of the minimum fuel injection pulse width TEMIN and the stored value TIST1M from the secondary fuel injection pulse width TIST3 as a new secondary fuel injection pulse width in the step S156. After the process of the step S156, the controller proceeds to the last step S57 where the secondary fuel injection pulse width that will actually be commanded to the fuel injector 8 is set in a similar way as in the first embodiment, and terminates the subroutine.

According to this embodiment, the necessary fuel supply amount for the first combustion is ensured in each cylinder, so the stable first combustion in each cylinder is realized.

Next, referring to FIG. 32, a sixth embodiment of this invention will be described.

The fuel injector 8 operates by the electric current supplied from a battery that is mounted on the vehicle. According to the abovedescribed embodiments, the minimum fuel injection amount TEMIN of the fuel injector 8 is considered to be a fixed value, but the minimum fuel injection amount TEMIN actually varies according to a voltage VB of the battery. If the minimum fuel injection pulse width TEMIN is dynamically set according to the voltage VB of the battery, therefore a more precise air-fuel ratio control during engine startup will be realized.

According to this embodiment, as shown in FIG. 1, a battery voltage sensor 21 is further provided to detect the voltage VB of the battery. The controller 1 performs a subroutine shown in FIG. 32 instead of the subroutine of FIG. 11.

Figure 32:
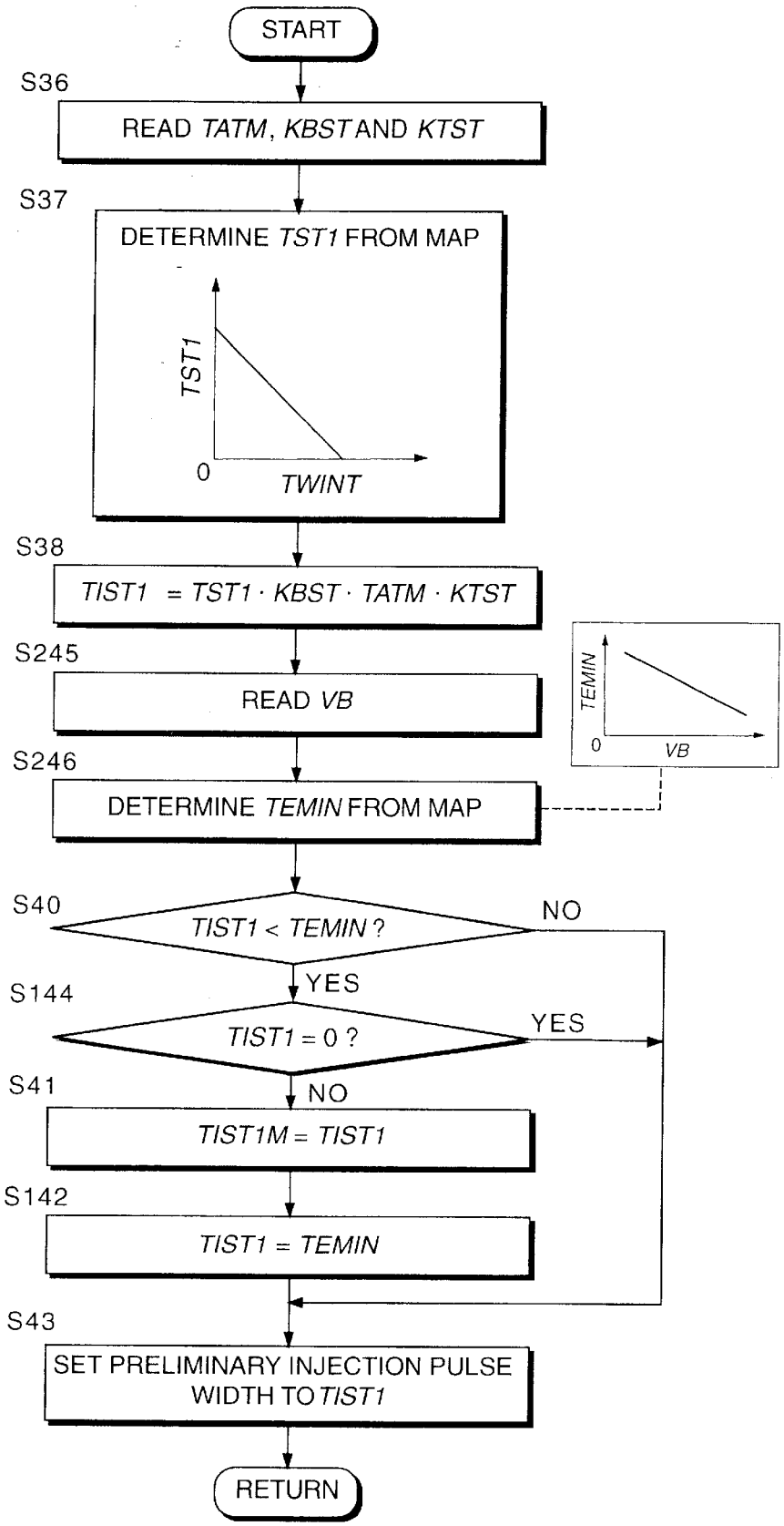
FIG. 32 is similar to FIG. 11 but showing a sixth embodiment of this invention.

The subroutine of FIG. 32 differs from that of FIG. 11 in that steps S245 and S239 are provided as a replacement of the step S39, a step S144 is provided between the steps S40 and S41, and a step S142 is provided as a replacement of the step S42.

The controller 1 reads the voltage VB of the battery in the step S245, looks up a map prestored in the memory of the controller 1 in the following step S239, and determines the minimum fuel injection pulse width TEMIN from the voltage VB. Herein, the map specifies that the value of TEMIN increases as the voltage VB lowers as specified in the block of the step S239.

The process of the step S144 and the step S142 is identical to that of the subroutine of FIG. 29 of the fifth embodiment.

By varying the value of the minimum fuel injection pulse width TEMIN according to the voltage VB of the battery in this way, the precision of air-fuel ratio control during engine startup is further improved.

Setting of the minimum fuel injection pulse width TEMIN according to the voltage VB of the battery can also be applied to any one of the first through fifth embodiments.

The contents of Tokugan 2001-246489, with a filing date of Aug. 15, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

TABLE 1

| FIRST CYLINDER-STROKE IDENTIFICATION | #5 | #4 | #2 | #1 | #8 | #7 | #3 | #6 |
|---|---|---|---|---|---|---|---|---|
| PRIMARY INJECTION IN | #1,#8,#7 | #8,#7,#3 | #7,#3,#6 | #3,#6,#5 | #6,#5,#4 | #5,#4,#2 | #4,#2,#1 | #2,#1,#8 |

TABLE 1-continued

| | | | | | | | | |
|---|---|---|---|---|---|---|---|---|
| EXTREME LOW TEMP. RANGE | | | | | | | | |
| PRIMARY INJECTION IN LOW/NORMAL TEMP. RANGE | #1,#8 | #8,#7 | #7,#3 | #3,#6 | #6,#5 | #5,#4 | #4,#2 | #2,#1 |
| HOSCYL 1 | #4 | #2 | #1 | #8 | #7 | #3 | #6 | #5 |
| HOSCYL 2 | #2 | #1 | #8 | #7 | #3 | #6 | #5 | #4 |

What is claimed is:

1. A fuel injection control device for use with an internal combustion engine, the engine comprising a plurality of cylinders which sequentially perform a combustion of fuel and a starter motor which cranks up the engine, each of the cylinders having an intake port and a fuel injector which injects fuel into the intake port, and sequentially performing an intake stroke, a compression stroke, a expansion stroke and an exhaust stroke, the device comprising:

a first sensor which detects a start of the starter motor;
a second sensor which detects a cylinder in a specific position in a specific stroke and generates a corresponding signal: and
a programmable controller programmed to:
execute a cylinder-stroke identification identifying a present stroke of each cylinder based on the signal generated by the second sensor; and
control the fuel injectors to simultaneously perform a primary fuel injection for a cylinder in the intake stroke and for a cylinder in the exhaust stroke simultaneously, on the first execution of the cylinder-stroke identification.

2. The fuel injection control device as defined in claim 1, wherein the controller is further programmed to control the fuel injectors to sequentially perform a subsequent fuel injection for a cylinder in the exhaust stroke on a second and later executions of the cylinder-stroke identification.

3. The fuel injection control device as defined in claim 2, wherein the controller is further programmed to control the fuel injectors to simultaneously perform a preliminary fuel injection for all the cylinders previous to the first execution of the cylinder-stroke identification.

4. The fuel injection control device as defined in claim 3, wherein the second sensor comprises a sensor which generates a reference signal when any one of the cylinders is in the specific position in the specific stroke and a sensor which identifies a cylinder to which the reference signal corresponds, and the controller is further programmed to control the fuel injectors to perform the preliminary fuel injection between a first generation of the reference signal and the first execution of the cylinder-stroke identification.

5. The fuel injection control device as defined in claim 4, wherein the controller is further programmed to determine if a first combustion in any cylinder has been performed, set a start timing of the subsequent fuel injection according to an elapsed time from an immediately preceding generation of the reference signal until the first combustion is performed in any cylinder, and set the start timing of the subsequent fuel injection through a process that an end timing of the fuel injection and a time period for the fuel injection are first determined and the start timing of the subsequent fuel injection is then determined by subtracting the time period for the fuel injection from the end timing thereof, after the first combustion is performed in any cylinder.

6. The fuel injection control device as defined in claim 3, wherein the controller is further programmed to calculate a required fuel injection amount required for a first combustion in each cylinder, calculate a deficiency from the required fuel amount and a maximum possible fuel injection amount of the fuel injector, and control the fuel injectors to perform the preliminary fuel injection with a fuel amount to compensate the deficiency.

7. The fuel injection control device as defined in claim 3, wherein the device further comprises a sensor which detects an intake air amount of the engine, and the controller is further programmed to calculate a required fuel injection amount from the intake air amount and apply the larger of a value obtained by subtracting an amount of the preliminary fuel injection from the required fuel injection amount and a predetermined primary fuel injection amount to a fuel injection amount for the primary fuel injection.

8. The fuel injection control device as defined in claim 7, wherein the controller is further programmed to apply the larger of a value obtained by subtracting an amount of the preliminary fuel injection from the required fuel injection amount and a predetermined subsequent fuel injection amount to a fuel injection amount for the subsequent fuel injection.

9. The fuel injection control device as defined in claim 3, wherein the controller is further programmed to calculate a fuel injection amount for the preliminary fuel injection, compare the fuel injection amount for the preliminary fuel injection with a predetermined minimum fuel injection amount, prevent the preliminary fuel injection from being performed when the fuel injection amount for the preliminary fuel injection is smaller than the predetermined minimum fuel injection amount, and increase a fuel injection amount for the primary fuel injection and a fuel injection amount for the subsequent fuel injection for an increment corresponding to the fuel injection amount for the preliminary fuel injection.

10. The fuel injection control device as defined in claim 3, wherein the controller is further programmed to calculate a fuel injection amount for the preliminary fuel injection, compare the fuel injection amount for the preliminary fuel injection with a predetermined minimum fuel injection amount, correct the fuel injection amount for the preliminary fuel injection to be equal to the predetermined minimum fuel injection amount when the fuel injection amount for the preliminary fuel injection is smaller than the predetermined minimum fuel injection amount, and respectively decrease a fuel injection amount for the primary fuel injection and a fuel injection amount for the subsequent fuel injection for a decrement corresponding to a difference between the fuel injection amount for the preliminary fuel injection before correction and the predetermined minimum fuel injection amount.

11. The fuel injection control device as defined in claim 10, wherein the fuel injectors operate by electric power, the device further comprises a sensor which detects a voltage of the electric power applied to the fuel injectors, and the controller is further programmed to set the predetermined minimum fuel injection amount according to the voltage of the electric power.

12. The fuel injection control device as defined in claim 3, wherein the controller is further programmed to increase a fuel injection amount to be injected after the preliminary fuel injection, for a specific cylinder which was in the intake stroke when the preliminary-fuel injection was performed.

13. The fuel injection control device as defined in claim 12, wherein the controller is further programmed to set an increment for increasing the fuel injection amount for the specific cylinder to be equal to a fuel injection amount for the preliminary fuel injection.

14. The fuel injection control device as defined in claim 12, wherein the controller is further programmed to calculate an amount of fuel injected during a predetermined period in the preliminary fuel injection, and set an increment for increasing the fuel injection amount for the specific cylinder to be equal to the amount of fuel injected during the predetermined period in the preliminary fuel injection.

15. The fuel injection control device as defined in claim 12, wherein the controller is further programmed to calculate an amount of fuel injected during a predetermined period in the preliminary fuel injection, calculate a wall flow component of the amount of fuel injected during the predetermined period, and set an increment for increasing the fuel injection amount for the specific cylinder to be equal to a value obtained by subtracting the wall flow component from the amount of fuel injected during the predetermined period.

16. The fuel injection control device as defined in claim 15, wherein the device further comprises a sensor which detects a temperature of the engine, and the controller is further programmed to set the wall flow component according to the temperature of the engine.

17. The fuel injection control device as defined in claim 16, wherein the controller is further programmed to decrease the wall flow component as the temperature of the engine increases.

18. The fuel injection control device as defined in claim 1, wherein the controller is further programmed to determine if a fuel injection pressure has reached a predetermined pressure and prevent the fuel injectors from injecting fuel when the fuel injection pressure has not reached the predetermined pressure.

19. A fuel injection control device for use with an internal combustion engine, the engine comprising a plurality of cylinders which sequentially perform a combustion of fuel and a starter motor which cranks up the engine, each of the cylinders having an intake port and a fuel injector which injects fuel into the intake port, and sequentially performing an intake stroke, a compression stroke, a expansion stroke and an exhaust stroke, the device comprising:

means for detecting a start of the starter motor;

means for detecting a cylinder in a specific position in a specific stroke and generating a corresponding signal;

means for executing a cylinder-stroke identification identifying a present stroke of each cylinder based on the signal generated by the cylinder detecting means; and means for controlling the fuel injectors to simultaneously perform a primary fuel injection for a cylinder in the intake stroke and for a cylinder in the exhaust stroke simultaneously, on the first execution of the cylinder-stroke identification.

20. A fuel injection control method for an internal combustion engine, the engine comprising a plurality of cylinders which sequentially perform a combustion of fuel and a starter motor which cranks up the engine, each of the cylinders having an intake port and a fuel injector which injects fuel into the intake port, and sequentially performing an intake stroke, a compression stroke, a expansion stroke and an exhaust stroke, the method comprising:

detecting a start of the starter motor;

detecting a cylinder in a specific position in a specific stroke;

executing a cylinder-stroke identification identifying a present stroke of each cylinder based on the cylinder in the specific position in the specific stroke; and controlling the fuel injectors to simultaneously perform a primary fuel injection for a cylinder in the intake stroke and for a cylinder in the exhaust stroke simultaneously, on the first execution of the cylinder-stroke identification.

* * * * *